(12) United States Patent
Rao et al.

(10) Patent No.: US 11,109,085 B2
(45) Date of Patent: Aug. 31, 2021

(54) UTILIZING ONE HASH PERMUTATION AND POPULATED-VALUE-SLOT-BASED DENSIFICATION FOR GENERATING AUDIENCE SEGMENT TRAIT RECOMMENDATIONS

(71) Applicant: Adobe Inc., San Jose, CA (US)

(72) Inventors: Anup Rao, San Jose, CA (US); Yasin Abbasi Yadkori, San Francisco, CA (US); Tung Mai, San Jose, CA (US); Ryan Rossi, Mountain View, CA (US); Ritwik Sinha, Cupertino, CA (US); Matvey Kapilevich, Irvington, NY (US); Alexandru Ionut Hodorogea, Bucharest (RO)

(73) Assignee: ADOBE INC., San Jose, CA (US)

( * ) Notice: Subject to any disclaimer, the term of this patent is extended or adjusted under 35 U.S.C. 154(b) by 116 days.

(21) Appl. No.: 16/367,628

(22) Filed: Mar. 28, 2019

(65) Prior Publication Data

US 2020/0314472 A1  Oct. 1, 2020

(51) Int. Cl.
*G06F 7/00*  (2006.01)
*G06F 16/00*  (2019.01)
(Continued)

(52) U.S. Cl.
CPC ... *H04N 21/25883* (2013.01); *H04N 21/2668* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 2003/0095701 A1* | 5/2003 | Shum | G06T 11/00 382/155 |
| 2007/0217676 A1* | 9/2007 | Grauman | G06K 9/6212 382/170 |
| 2018/0357519 A1* | 12/2018 | Jin | G06K 9/6282 |

OTHER PUBLICATIONS

[Bayardo et al., 2007] Bayardo, R. J., Ma, Y., and Srikant, R. (2007). Scaling up all pairs similarity search. In Proceedings of the 16th international con-ference on World Wide Web, pp. 131-140. ACM.
(Continued)

*Primary Examiner* — Tuan A Pham
(74) *Attorney, Agent, or Firm* — Keller Jolley Preece

(57) ABSTRACT

The present disclosure relates to training a recommendation model to generate trait recommendations using one permutation hashing and populated-value-slot-based densification. In particular, the disclosed systems can train the recommendation model by computing sketch vectors corresponding to traits using one permutation hashing. The disclosed systems can then fill in unpopulated value slots of the sketch vectors using populated-value-slot-based densification. The disclosed systems can combine the resulting densified sketches to generate the trained recommendation model. For example, in some embodiments, the disclosed systems can combine the sketches by generating a plurality of locality sensitive hashing tables based on the sketches. In some embodiments, the disclosed systems generate a count sketch matrix based on the sketches and generate trait embeddings based on the count sketch matrix using spectral embedding. Based on the trait embeddings, the disclosed systems can utilize the recommendation model to flexibly and accurately determine the similarity between traits.

20 Claims, 15 Drawing Sheets

(51) Int. Cl.
  *H04N 21/258*   (2011.01)
  *H04N 21/482*   (2011.01)
  *H04N 21/2668*  (2011.01)

(56) References Cited

OTHER PUBLICATIONS

[Broder, 1997] Broder, A. Z. (1997). On the resemblance and containment of documents. In Compression and complexity of sequences 1997. proceedings, pp. 21-29. IEEE.
[Broder et al., 1997] Broder, A. Z., Glassman, S. C., Manasse, M. S., and Zweig, G. (1997). Syntactic clustering of the web. Computer Networks and ISDN Systems, 29(8):1157-1166.
[Chen and Shrivastava, 2016] Chen, B. and Shrivastava, A. (2016). Revisiting winner take all (WTA) hashing for sparse datasets. CoRR, abs/1612.01834.
[Chum et al., 2007] Chum, O., Philbin, J., Isard, M., and Zisserman, A. (2007). Scalable near identical image and shot detection. pp. 549-556.
[Chum et al., 2008] Chum, O., Philbin, J., and Zisserman, A. (2008). Near duplicate image detection: minhash and tf-idf weighting.
[D. Ondov et al., 2016] D. Ondov, B., J. Treangen, T., Melsted, P., B. Mallonee, A., Bergman, N., Koren, S., and M. Phillippy, A. (2016). Mash: Fast genome and metagenome distance estimation using minhash. Genome Biology, 17.
[Dahlgaard et al., 2015] Dahlgaard, S., Knudsen, M. B. T., Rotenberg, E., and Thorup, M. (2015). Hashing for statistics over k-partitions. In Proc. 56th IEEE Symposium on Foundations of Computer Science, pp. 1292-1310. ACM.
[Dahlgaard et al., 2017] Dahlgaard, S., Knudsen, M. B. T., and Thorup, M. (2017). Fast similarity sketching. In Foundations of Computer Science (FOCS), 2017 IEEE 58th Annual Symposium on, pp. 663-671. IEEE.
[Henzinger, 2006] Henzinger, M. (2006). Finding near-duplicate web pages: a large-scale evaluation of algorithms. In Proceedings of the 29th annual international ACM SIGIR conference on Research and development in information retrieval, pp. 284-291. ACM.
[Indyk and Motwani, 1998] Indyk, P. and Motwani, R. (1998). Approximate nearest neighbors: towards removing the curse of dimensionality. In Proceedings of the thirtieth annual ACM symposium on Theory of computing, pp. 604-613. ACM.
[Li et al., 2012] Li, P., Owen, A., and Zhang, C.-H. (2012). One permutation hashing. In Advances in Neural Information Processing Systems, pp. 3113-3121.
[Li et al., 2011] Li, P., Shrivastava, A., Moore, J. L., and Konig, A. C. (2011). Hashing algorithms for large-scale learning. In Advances in neural information processing systems, pp. 2672-2680.
[Manasse et al., 2010] Manasse, M., McSherry, F., and Talwar, K. (2010). Consistent weighted sampling.
[Shi et al., 2018] Shi, Y., Cost, R., Perlich, C., Hook, R., Martin, W., Han Williams, M., Moynihan, J., McCarthy, P., Lenz, P., and Daniel-Weiner, R. (2018). Audience size forecasting: Fast and smart budget planning for media buyers. pp. 744-753.
[Shrivastava, 2017] Shrivastava, A. (2017). Optimal densification for fast and accurate minwise hashing. In Precup, D. and Teh, Y. W., editors, Proceedings of the 34th International Conference on Machine Learning, vol. 70 of Proceedings of Machine Learning Research, pp. 3154-3163, International Convention Centre, Sydney, Australia. PMLR.
[Shrivastava and Li, 2014a] Shrivastava, A. and Li, P. (2014a). Densifying one permutation hashing via rotation for fast near neighbor search. In International Conference on Machine Learning, pp. 557-565.
[Shrivastava and Li, 2014b] Shrivastava, A. and Li, P. (2014b). Improved densification of one permutation hashing. In Proceedings of the Thirtieth Conference on Uncertainty in Artificial Intelligence, UAI'14, pp. 732-741, Arlington, Virginia, United States. AUAI Press.

\* cited by examiner

| 302 | 304 | 306 | 308 | 310 | 312 | 314 |
|---|---|---|---|---|---|---|
| User ID 0001 | Male | 18-24 | United States | Student | Desktop | 2 Years |
| User ID 0002 | Female | Under 12 | United States | Student | Desktop | 5 Years |
| User ID 0003 | Female | 18-24 | Canada | Educator | Laptop | 0 Years |
| User ID 0004 | Female | 25-34 | United States | Physician | Tablet | 1 Years |
| User ID 0005 | Male | 25-34 | Mexico | Educator | Smartphone | 4 Years |
| User ID 0006 | Male | 18-24 | England | Student | Laptop | 2 Years |
| User ID 0007 | Female | 45-54 | Germany | Lawyer | Laptop | 2 Years |
| User ID 0008 | Male | 35-44 | Canada | Law Enforcement | Desktop | 1 Years |
| User ID 0009 | Female | 12-17 | South Africa | Student | Desktop | 6 Years |
| User ID 0010 | Female | 18-24 | Japan | Student | Tablet | 4 Years |
| User ID 0011 | Male | 25-34 | Japan | Physician | Smartphone | 0 Years |
| User ID 0012 | Male | 25-34 | United States | Retail Manager | Desktop | 3 Years |
| User ID 0013 | Male | Under 12 | Spain | Student | Desktop | 7 Years |
| User ID 0014 | Female | 55-64 | Brazil | Entrepreneur | Tablet | 2 Years |

*Fig. 3*

Similar Traits For: Trial Status and not Cancelled

| Trait ID | Trait Name | Unique Trait Realizations | Total Trait Population | Data Source | Trait Similarity Score | Add to Segments |
|---|---|---|---|---|---|---|
| 13374099 | Tier 1 Subscription | 219,319 | 736,018 | Adobe | 0.8819 | + |
| 8221868 | Ordered as Guest – No Sub | 231,762 | 790,280 | Adobe | 0.8139 | + |
| 12231401 | Ordered < 5 Times | 416,940 | 41,013,823 | Adobe | 0.4527 | + |
| 2535738 | Money Spent <$1,000 | 804,319 | 336,454,881 | Adobe CRM | 0.2106 | + |
| 10120443 | Recommended by Sub: Yes | 53,383 | 238,837 | Adobe | 0.1944 | + |

Fig. 11

UTILIZING ONE HASH PERMUTATION AND POPULATED-VALUE-SLOT-BASED DENSIFICATION FOR GENERATING AUDIENCE SEGMENT TRAIT RECOMMENDATIONS

BACKGROUND

Recent years have seen significant improvement in hardware and software platforms for building distribution segments for providing digital content to client devices across computer networks. For example, conventional content distribution systems can automatically propose traits for client devices and/or users corresponding to client devices for distributing digital content in accordance with a digital content campaign. In particular, some digital content distribution systems can analyze an input trait (e.g., submitted by an administrator) and determine one or more other traits that are similar to the input trait in relation to historical segment populations.

Despite these advances, however, conventional digital content distribution systems suffer from several technological shortcomings that lead to inefficient, inflexible, and inaccurate operation. For example, conventional digital content distribution systems are often inefficient in that they employ models that generate recommendations using computationally expensive processes. To illustrate, conventional systems typically employ models that analyze every user associated with every trait in order to determine the overlap between the population of users associated with each trait. Such analysis, however, requires a significant amount of computing resources (e.g., time, processing power, and computing memory) to handle the massive amounts of trait data available to many systems. Indeed, some systems can manage billions or even trillions of interactions via client devices reflecting particular traits.

Some conventional systems seek to address efficiency concerns by training models to generate recommendations utilizing minwise hashing, which reduces the raw trait data into sketches that are then compared (e.g., to estimate Jaccard similarity) to determine the similarity between traits. But training a model using minwise hashing remains computationally expensive as it utilizes multiple steps of raw data analysis (e.g., hundreds or thousands of steps) to generate the sketches. Other conventional systems train models utilizing one permutation hashing to generate the sketches using a single step of raw data analysis (e.g., a single hashing pass). Such systems typically use a subsequent densification routine that populates unpopulated value slots of the resulting sketches. For example, such systems can use densification routines that iteratively analyze unpopulated value slots to fill the unpopulated value slots of a sketch. Such densification routines may require a significant amount of time (and other computing resources) to match an unpopulated value slot with a populated value slot, especially where the number of populated value slots is relatively low.

In addition to efficiency concerns, conventional digital content distribution systems are also inflexible. As mentioned, many conventional systems employ models that determine the similarity between traits rigidly based on the overlap between their respective populations (i.e., the Jaccard similarity). Consequently, the models employed by such systems often fail to flexibly identify traits that are similar without express overlap across segment populations.

In addition to problems with inefficiency and inflexibility, conventional segment trait recommendation systems are also inaccurate. In particular, because many conventional systems often employ models that determine similarity strictly based on overlap of trait populations, such systems often inaccurately predict which traits are most relevant. Additionally, the densification routine employed by some conventional systems typically leads to a high variance in the accuracy of the resulting recommendations (i.e., high error in the determination of similarity between traits). In particular, by analyzing unpopulated value slots to identify populated value slots used in the densification, conventional systems risk populating unpopulated value slots based on the same populated value slot within the same round of densification, resulting in unbalanced densified sketches and highly variant recommendations.

These, along with additional problems and issues, exist with regard to conventional digital content distribution systems.

SUMMARY

One or more embodiments described herein provide benefits and/or solve one or more of the foregoing or other problems in the art with systems, methods, and non-transitory computer readable storage media that train a recommendation model utilizing sketches of traits generated by one permutation hashing and an efficient densification routine to accurately generate recommendations for traits that are similar to an input trait. For example, the disclosed systems can train the recommendation model by computing a one permutation hashing sketch for traits included within stored event data. The disclosed systems can then apply a populated-value-slot-based densification routine to efficiently fill empty bins while maintaining a locality sensitive hashing property. After densification, the disclosed systems can combine the sketches to generate the trained recommendation model. For example, in some embodiments, the disclosed systems can combine the sketches by generating a plurality of locality sensitive hashing tables based on the sketches. In other embodiments, the disclosed systems generate trait embeddings from the sketches to train the recommendation model. To illustrate, the disclosed systems can generate a count sketch matrix based on the sketches and generate trait embeddings based on the count sketch matrix using spectral embedding. Based on the trait embeddings, the disclosed systems can utilize the recommendation model to flexibly and accurately determine the similarity between traits.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3 illustrates a table containing a plurality of training samples that can be used to train a distribution segment trait recommendation model in accordance with one or more embodiments;

FIG. 11 illustrates another user interface through which the segment generation system can provide distribution segment trait recommendations in accordance with one or more embodiments;

DETAILED DESCRIPTION

Figure 1:
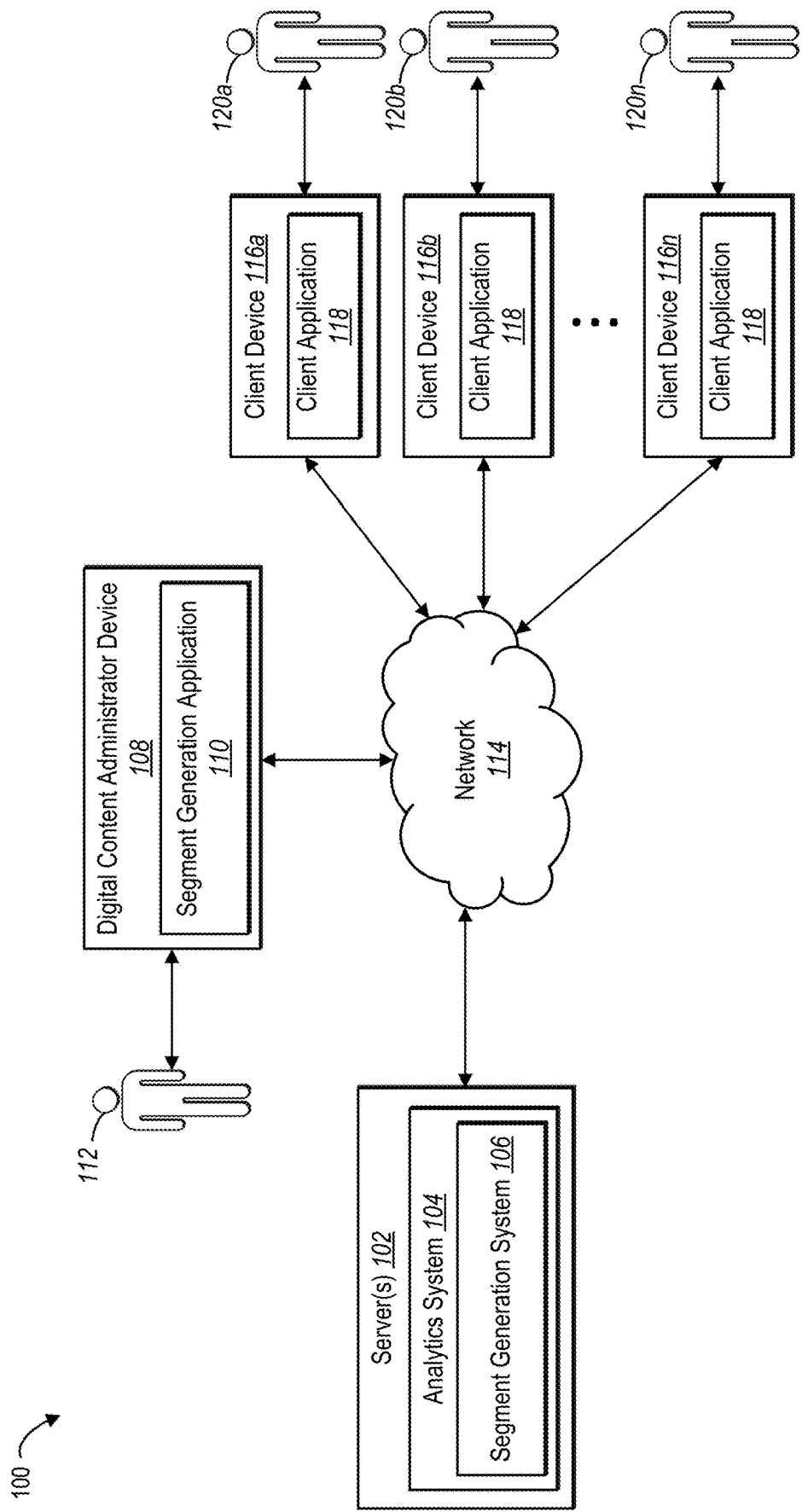
FIG. 1 illustrates an example environment in which a segment generation system can operate in accordance with one or more embodiments.

One or more embodiments described herein include a segment generation system that utilizes one permutation hashing and a densification routine that fills in empty sketch bins by iteratively analyzing non-empty sketch bins to efficiently train a recommendation model to generate trait recommendations that are accurately similar to an input trait. For example, the segment generation system can use one permutation hashing to compute a sketch for each trait included within stored event data and a populated-value-slot-based densification routine to fill in the empty bins (i.e., bins containing no value) of each resulting sketch while preserving locality sensitive hashing. For example, the segment generation system can fill the empty bins by analyzing the non-empty bins using a randomized hashing function, identifying the empty bins based on the analysis, and filling the empty bins using the non-empty bins (e.g., using the value of the non-empty bins). In one or more embodiments, the segment generation system then constructs a plurality of locality sensitive hashing tables based on the densified sketches. In some embodiments, the segment generation system utilizes count sketch to construct, based on the densified sketches, a matrix and uses the left singular vectors of the matrix to generate metric embeddings of the traits.

Once trained, the segment generation system can utilize the recommendation model to generate recommendations for traits that can be used to build an audience segment.

To provide an example, in one or more embodiments, the segment generation system trains a distribution segment trait recommendation model by utilizing a one permutation hashing model to generate a plurality of sketch vectors from training samples. In particular, the segment generation system can utilize training samples that include a plurality of distribution segment traits to generate sketch vectors that correspond to one of those distribution segment traits. In one or more embodiments, the segment generation system then generates a plurality of densified sketch vectors from the plurality of sketch vectors. For example, in one or more embodiments, the segment generation system utilizes a populated-value-slot-based densification model to fill in unpopulated value slots of the sketch vectors resulting from the one permutation hashing. Subsequently, in some embodiments, the segment generation system combines the densified sketch vectors by generating a plurality of locality sensitive hashing tables. In further embodiments, the segment generation system combines the densified sketch vectors by generating a count sketch matrix based on the densified sketch vectors and then utilizing a singular value decomposition model to generate a plurality of trait embeddings based on the count sketch matrix. The segment generation system can utilize the trained distribution segment trait recommendation model to determine traits that are similar to an input trait and generate distribution segment trait recommendations for those traits.

As just mentioned, in one or more embodiments, the segment generation system trains a distribution segment trait recommendation model by using a one permutation hashing model to generate a plurality of sketch vectors corresponding to distribution segment traits. In particular, the one permutation hashing model can generate a sketch vector for each distribution segment trait from a collection of training samples using one step of raw data analysis. To illustrate, in one or more embodiments, the one hash permutation model divides the training samples into a plurality of sample regions. The one hash permutation model can then apply a hash function to the training samples that correspond to a particular distribution segment trait for which the one hash permutation model is generating the sketch vector. The resulting sketch vectors include a plurality of value slots.

Additionally, as mentioned above, in one or more embodiments, the segment generation system further trains the distribution segment trait recommendation model by generating a plurality of densified sketch vectors. In particular, the sketch vectors generated by the one permutation hashing model can include one or more unpopulated value slots due to the one permutation hashing process. Consequently, the segment generation system applies a densification model to the sketch vectors to populate the unpopulated value slots.

In one or more embodiments, the segment generation system utilizes a populated-value-slot-based densification model to generate the densified sketch vectors. In particular, to generate a densified sketch vector from a sketch vector, the populated-value-slot-based densification model can iteratively apply a hash function to an index of a populated value slot of the sketch vector to determine an index value. The segment generation system can then determine an unpopulated value slot of the sketch vector based on the index value and populate the unpopulated value slot based on the populated value slot. In one or more embodiments, the populated-value-slot-based densification model populates the unpopulated value slot with a copy of a value of the populated value slot. In this manner, the segment generation system can generate a densified sketch vector while maintaining locality sensitive hashing.

As further mentioned above, in one or more embodiments, the segment generation system further trains the distribution segment trait recommendation model by combining the densified sketch vectors. In some embodiments, the segment generation system combines the densified sketch vectors by generating a plurality of locality sensitive hashing tables from the densified sketch vectors. For example, the segment generation system can generate a locality sensitive hashing table corresponding to each value slot index of the densified sketch vectors (e.g., a first locality sensitive hashing table corresponding to a first value slot of the densified sketches, a second locality sensitive hashing table corresponding to a second value slot of the densified sketches, etc.).

In some embodiments, the segment generation system combines the densified sketch vectors by generating a count sketch matrix based on the densified sketch vectors. In particular, the segment generation system can apply a count sketch model to densified sketch vectors to generate the count sketch matric. The distribution segment trait recommendation model can then utilize a singular value decomposition model to generate trait embeddings. For example, the segment generation system can determine a plurality of left singular vectors of the count sketch matrix, utilize the top left singular vectors to generate a left singular vector matrix, and generate a plurality of trait embedding vectors based on the left singular vector matrix. In one or more embodiments, each trait embedding vector corresponds to a particular trait.

The segment generation system can utilize the trained distribution segment trait recommendation model to generate distribution segment trait recommendations. For example, the segment generation system can identify an input distribution segment trait and generate the distribution segment trait recommendation based on the input distribution segment trait. In one or more embodiments, the distribution segment trait recommendation model generates the recommendation utilizing the plurality of locality sensitive hashing tables to compare the input distribution segment trait to one or more additional distribution segment traits. In some embodiments, the distribution segment trait recommendation model generates the recommendation by comparing trait embeddings (e.g., trait embedding vectors) corresponding to the input distribution segment trait and one or more other distribution segment traits, respectively.

The segment generation system provides several advantages over conventional systems. For example, the segment generation system improves efficiency. In particular, by utilizing populated-value-slot-based densification to densify the sketch vectors generated by the one permutation hashing model, the segment generation system reduces the time required to generate densified sketch vectors. Specifically, by iteratively analyzing populated value slots of sketch vectors to identify and fill unpopulated value slots while preserving locality sensitive hashing, the segment generation system more efficiently matches populated value slots and unpopulated value slots. Consequently, the segment generation system reduces the amount of time, processing power, and memory required to train the distribution segment trait recommendation model.

Further, the segment generation system operates more flexibly than conventional systems. In particular, by training the distribution segment trait recommendation model to generate distribution segment trait recommendations based on trait embeddings, the segment generation system can identify similarities between distribution segment traits based on a more abstract level. Consequently, the segment generation system can flexibly identify and recommend a distribution segment trait that is similar to an input distribution segment trait even where the populations of the two distribution segment traits do not overlap.

Additionally, the segment generation system improves accuracy. For example, by utilizing populated-value-slot-based densification, the segment generation system reduces the variance of the resulting recommendations (i.e., reduces the error made by the distribution segment trait recommendation model in determining the similarity between distribution segment traits). In particular, by analyzing populated value slots of sketch vectors to identify unpopulated value slots, the segment generation system avoids populating multiple unpopulated value slots based on the same populated value slot within the same round of densification, leading to a more balanced densified sketch vector. Further, by generating distribution segment trait recommendations based on trait embeddings, the segment generation system can determine the similarity between two distribution segment traits more accurately than conventional systems, especially where the populations of the distribution segment traits do not overlap.

As illustrated by the foregoing discussion, the present disclosure utilizes a variety of terms to describe features and benefits of the segment generation system. Additional detail is now provided regarding the meaning of these terms. For example, as used herein, the term "distribution segment trait" refers to a trait or characteristic associated with a user or client device. In particular, a distribution segment trait can refer to digital data that describes a client device/user or an environment, circumstance, or status of the client device/ user. For example, a distribution segment trait can include age, gender, location, type of computing device (e.g., mobile versus laptop, operating system, client device manufacturer, subscription status with respect to an online service or computer application, interaction history, purchase history, etc. Further, a distribution segment trait can refer to a particular population of users associated with the same trait or characteristic.

Additionally, as used herein, the term "distribution segment trait recommendation model" refers to a computer algorithm or model that generates distribution segment trait recommendations. In particular, a distribution segment trait recommendation model includes a computer algorithm that recommends distribution segment traits based on a similarity to an input distribution segment trait. For example, the distribution segment trait recommendation model can include one or more machine learning models trained to determine similarities between distribution segment traits. More detail regarding the distribution segment trait recommendation model will be provided below.

As used herein, the term "sketch" refers to an approximation of input data that reduces the dimensionality of the input data while preserving one or more key statistics. For instance, as applied to segment traits, a sketch refers to an approximation of a distribution segment trait within a population. In particular, a sketch refers to a collection of data or values that summarizes or approximates a distribution segment trait (e.g., at a reduced dimensionality) while preserving one or more statistical characteristics of the distribution segment trait. For example, a sketch can include a collection of data that is a compressed version of a larger collection of data that represents a distribution segment trait. Relatedly, as used herein, a "sketch vector" refers to a data structure (e.g., a vector) that includes (e.g., stores) a collection of data or values corresponding to a sketch. Specifically, a sketch vector can have one or more value slots containing data that summarizes or approximates a distribution segment trait within a population. Additional detail regarding sketches and sketch vectors is provided below.

Additionally, as used herein, the term "densified sketch" refers to a sketch to which data has been added after generation of an initial sketch. In particular, a densified sketch refers to a collection of data or values resulting from application of a densification routine (i.e., a routine, method, or algorithm for adding data) to a sketch. Relatedly, a "densified sketch vector" refers to a data structure (e.g., a vector) that includes (e.g., stores) a collection of data or values corresponding to a densified sketch. For example, a densified sketch vector can include a vector generated by populating one or more unpopulated value slots of a sketch vector.

As used herein, the term "one permutation hashing" or "one permutation hashing model" refers to a computer algorithm or model that generates sketches or sketch vectors. In particular, a one permutation hashing model refers to a computer algorithm that generates a sketch vector corresponding to a distribution segment trait based on one pass or one step of analysis of raw data (i.e., training samples comprising data corresponding to one or more distribution segment traits). For example, a one permutation hashing model can include a computer algorithm for applying a hash function to samples of raw data in a single pass to generate a sketch vector corresponding to a distribution segment trait. More detail regarding the one permutation hashing model will be provided below.

Additionally, as used herein, the term "populated-value-slot-based densification" or "populated-value-slot-based densification model" refers to a computer algorithm or model that generates densified sketch vectors. In particular, a populated-value-slot-based densification model includes a computer algorithm that iteratively analyzes populated value slots in a sketch vector to populate one or more unpopulated value slots of a sketch vector corresponding to a distribution segment trait to generate a densified sketch vector corresponding to the distribution segment trait (e.g., so that the densified sketch vector has the LSH property a discussed in more detail below). Specifically, a populated-value-slot-based densification model can refer to a computer algorithm that analyzes a populated value slot of a sketch vector to identify an unpopulated value slot of the sketch vector and then populates the unpopulated value slot based on the populated value slot. More detail regarding the populated-value-slot-based densification model will be provided below. The populated-value-slot based densification model is in contrast to conventional densification models that iteratively analyze unpopulated value slots to identify populated values for densification.

Further, as used herein, the term "hash function" refers to a computer algorithm or function that maps data values. In particular, a hash function refers to a computer implemented function that generates output values (i.e., hash values) of fixed size based on input values of arbitrary or fixed size. For example, a hash function can include a computer implemented mapping function that maps values within an input range to values of fixed size within an output range.

Additionally, as used herein, the term "trait embedding" refers to a representation of a distribution segment trait. In particular, a trait embedding refers to a value or a collection or values, which can be used by a model to generate a subsequent value (e.g., an output, such as a distribution segment trait recommendation). For example, a trait embedding can refer to a collection of values representing a distribution segment trait generated by analyzing a densified sketch (e.g., a densified sketch vector) corresponding to the distribution segment trait. Relatedly, a "trait embedding vector" refers to a data structure (e.g., a vector) that includes (e.g., stores) a plurality of values corresponding to a trait embedding.

Further, as used herein, the term "singular value decomposition model" refers to a computer algorithm or model that performs factorization on a real or complex matrix. In particular, a singular value decomposition model refers to a computer algorithm that analyzes a matrix to determine the left-singular vectors, the singular values, and the right-singular vectors of the matrix. For example, the singular value decomposition model can refer to a machine learning model. As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include, but is not limited to, a differentiable function approximator, a neural network (e.g., a convolutional neural network or deep learning model), a decision tree (e.g., a gradient boosted decision tree), association rule learning, inductive logic programming, support vector learning, Bayesian network, regression-based model, principal component analysis, or a combination thereof.

Additionally, as used herein, the term "locality sensitive hashing table" refers to a data structure that stores data for approximate near neighbor queries (e.g., queries based on Jaccard similarity). In particular, a locality sensitive hashing table refers to a table that stores data from densified sketch vectors for comparison of the densified sketch vectors. More detail regarding locality sensitive hashing tables will be provided below.

Further, as used herein, the term "count sketch matrix" refers to a data structure that includes (e.g., stores) frequency data. In particular, a count sketch matrix includes a matrix generating by applying count sketch algorithm to a plurality of sketches. For example, a count sketch matrix can include a matrix generated by applying a hash function to a densified sketch vector to map the values included within the densified sketch vector to values corresponding to frequencies. More detail regarding count sketch matrices will be provided below.

Additional detail regarding the segment generation system will now be provided with reference to the figures. For example, FIG. 1 illustrates a schematic diagram of an exemplary system environment ("environment") 100 in which a segment generation system 106 can be implemented. As illustrated in FIG. 1, the environment 100 can include a server(s) 102, a digital content administrator device 108, a digital content administrator 112, a network 114, client devices 116a-116n, and users 120a-120n.

Although the environment 100 of FIG. 1 is depicted as having a particular number of components, the environment 100 can have any number of additional or alternative components (e.g., any number of servers, digital content administrator devices, client devices, or other components in communication with the segment generation system 106 via the network 114). Similarly, although FIG. 1 illustrates a particular arrangement of the server(s) 102, the digital content administrator device 108, the digital content administrator 112, the network 114, the client devices 116a-116n, and the users 120a-120n, various additional arrangements are possible.

The server(s) 102, the digital content administrator device 108, the network 114, and the client devices 116a-116n may be communicatively coupled with each other either directly or indirectly (e.g., through the network 114 discussed in greater detail below in relation to FIG. 14). Moreover, the server(s) 102, the digital content administrator device 108, and the client devices 116a-116n may include a computing device (including one or more computing devices as discussed in greater detail below with relation to FIG. 14).

As mentioned above, the environment 100 includes the server(s) 102. The server(s) 102 can generate, store, receive, and/or transmit data, including distribution segment trait recommendations. For example, the server(s) 102 can receive an input distribution segment trait from the digital content administrator device 108 and transmit a distribution segment trait recommendation back to the digital content administrator device 108. In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect, manage, and utilize analytics data. For example, the analytics system 104 can collect analytics data related to events (e.g., click events, purchases, subscriptions, etc.), including data regarding users/client devices and the distribution segment traits associated with those users/client devices. The analytics system 104 can collect the analytics data in a variety of ways. For example, in one or more embodiments, the analytics system 104 causes the server(s) 102 and/or a third-party network server (e.g., a server hosting a website or online service) to track event data and report the tracked event data for storage on a database. In one or more embodiments, the analytics system 104 receives event data directly from the client devices 116a-116n via data stored thereon.

Additionally, the server(s) 102 include the segment generation system 106. In particular, in one or more embodiments, the segment generation system 106 uses the server(s) 102 to generate distribution segment trait recommendations. For example, the segment generation system 106 can use the server(s) 102 to identify an input distribution segment trait and use a distribution segment trait recommendation model to generate a distribution segment trait recommendation in response.

For example, in one or more embodiments, the server(s) 102 can train a distribution segment trait recommendation model to generate distribution segment trait recommendations. In particular, the server(s) 102 can train the distribution segment trait recommendation model by utilizing a one permutation hashing model to generate a plurality of sketch vectors from training samples comprising a plurality of client identifiers and distribution segment traits corresponding to the plurality of client identifiers. The server(s) 102 can then generate a plurality of densified sketch vectors from the plurality of sketch vectors using a populated-value-slot-based densification model. Subsequently, the server(s) 102 can combine the densified sketch vectors. Once the distribution segment trait recommendation model is trained, the server(s) 102 can identify an input distribution segment trait and utilize the distribution segment trait recommendation model to generate a distribution segment trait recommendation.

In one or more embodiments, the digital content administrator device 108 includes a computer device that allows a user of the device (e.g., the digital content administrator 112) to submit input distribution segment traits and receive distribution segment trait recommendations. For example, the digital content administrator device 108 can include a smartphone, a tablet, a desktop computer, a laptop computer, or other electronic device. The digital content administrator device 108 can include one or more applications (e.g., the segment generation application 110) that allows the digital content administrator 112 to submit input distribution segment traits and receive distribution segment trait recommendations. For example, the segment generation application 110 can include a software application installed on the digital content administrator device 108. Additionally, or alternatively, the segment generation application 110 can include a software application hosted on the server(s) 102, which may be accessed by the digital content administrator device 108 through another application, such as a browser.

In one or more embodiments, the client devices 116a-116n include computer devices that allow users of the devices (e.g., the users 120a-120n) to access and interact with digital content (e.g., to generate events). For example, the client devices 116a-116n can include smartphones, tablets, desktop computers, laptop computers, or other electronic devices. The client devices 116a-116n can include one or more applications (e.g., the client application 118) that allow the users 120a-120n to access and interact with digital content. For example, the client application 118 can include a software application installed on the client devices 116a-116n. Additionally, or alternatively, the client application 118 can include a software application hosted on the server(s) 102, which may be accessed by the client devices 116a-116n through another application, such as a web browser.

The segment generation system 106 can be implemented in whole, or in part, by the individual elements of the environment 100. Indeed, although FIG. 1 illustrates the segment generation system 106 implemented with regards to the server(s) 102, different components of the segment generation system 106 can be implemented in any of the components of the environment 100. The components of the segment generation system 106 will be discussed in more detail with regard to FIG. 12 below.

Figure 2:
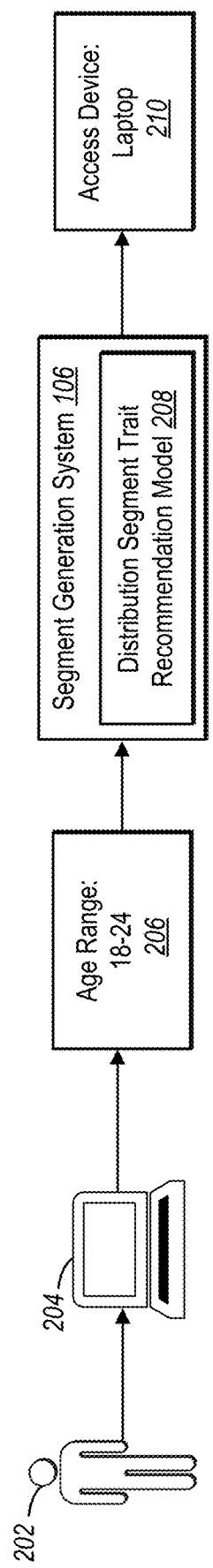
FIG. 2 illustrates a block diagram of a segment generation system generating a distribution segment trait recommendation in accordance with one or more embodiments.

As mentioned above, the segment generation system 106 can generate distribution segment trait recommendations. In particular, the distribution segment trait recommendations can include one or more distribution segment traits recommended for inclusion within an audience segment. FIG. 2 illustrates a block diagram of the segment generation system 106 generating a distribution segment trait recommendation in accordance with one or more embodiments.

As illustrated in FIG. 2, a digital content administrator 202 can utilize a digital content administrator device 204 to submit an input distribution segment trait 206, indicating a group of users that the digital content administrator 202 intends to include within an audience segment. For example, as shown in FIG. 2, the input distribution segment trait 206 includes an age range, indicating that the digital content administrator 202 intends to include users within the range of eighteen to twenty-four years old within an audience segment.

In one or more embodiments, the segment generation system 106 generates a distribution segment trait recommendation 210 based on the input distribution segment trait 206. In particular, the segment generation system 106 utilizes a distribution segment trait recommendation model 208 to generate the distribution segment trait recommendation 210. In one or more embodiments, the segment generation system 106 trains the distribution segment trait recommendation model 208 to generate distribution segment trait recommendations, as will be discussed in more detail below with respect to FIGS. 4-8B.

In some embodiments, the segment generation system 106 provides the distribution segment trait recommendation 210 for display on the digital content administrator device 204. In particular, the segment generation system 106 can provide a user interface for display on the digital content administrator device 204 and provide the distribution segment trait recommendation 210 for display within the user interface. Providing distribution segment trait recommendations for display within a user interface will be discussed in more detail with reference to FIGS. 10-11.

In one or more embodiments, the segment generation system 106 (e.g., the distribution segment trait recommendation model 208) generates the distribution segment trait recommendation 210 based on a similarity between the recommended distribution segment trait and the input distribution segment trait 206. For example, FIG. 2 shows the distribution segment trait recommendation 210 recommending adding laptop users to an audience segment based on a similarity between laptop users and users between the ages of eighteen and twenty-four.

In one or more embodiments, the segment generation system 106 automatically adds the distribution segment trait provided by the distribution segment trait recommendation 210 to the audience segment that includes the input distribution segment trait 206. In some embodiments, the segment generation system 106 adds the recommended distribution segment trait in response to a selection or acceptance by the digital content administrator 202. In further embodiments, the segment generation system 106 can add the recommended distribution segment trait to a separate audience segment (e.g., use the distribution segment trait recommendation 210 to generate a new audience segment).

It should be noted that, though FIG. 2 shows the distribution segment trait recommendation 210 recommending a single distribution segment trait, the distribution segment trait recommendation 210 can include any number of distribution segment traits. For example, the distribution segment trait recommendation 210 can include a plurality of distribution segment traits, and the segment generation system 106 can provide each recommended distribution segment trait for display on the digital content administrator device 204. The segment generation system 106 can then add, to an audience segment, any of the recommended distribution segment traits that have been selected by the digital content administrator 202.

As mentioned above, in one or more embodiments, the segment generation system 106 trains a distribution segment trait recommendation model to generate distribution segment trait recommendations. In particular, the segment generation system 106 can utilize training samples to train the distribution segment trait recommendation model. FIG. 3 illustrates a table 300 containing a plurality of training samples that can be used to train a distribution segment trait recommendation model in accordance with one or more embodiments.

As shown in FIG. 3, each training sample in table 300 includes a user ID and a plurality of distribution segment traits associated with the user ID (e.g. user IDs and known attributes corresponding to users/client devices that visited a website in a particular time period). Specifically, the table 300 includes a plurality of rows—where each row includes a training sample corresponding to a particular user ID—and a plurality of columns—where each column corresponds to a particular data type included in the training sample. As an illustration, the table 300 includes a column 302 storing the user IDs, a column 304 storing a gender of the corresponding user ID (i.e., the gender of the user associated with the corresponding user ID), a column 306 storing an age range of the corresponding user ID, a column 308 storing a geographic location of the corresponding user ID, a column 310 storing an occupation of the corresponding user ID, a column 312 storing a device indicator of the corresponding user ID (e.g., a device used to initiate generation of the event data, such as by clicking a link), and a column 314 storing a subscription length of the corresponding user ID (i.e., a length of time a user corresponding to the user ID has subscribed to a particular service, such as one offered by a digital content administrator). It should be noted that the table 300 can store any distribution segment trait corresponding to a user ID. In some embodiments, the table 300 stores hundreds or thousands of distribution segment traits corresponding to any given user ID.

In one or more embodiments, the segment generation system 106 collects and stores the training samples within the table 300 at the occurrence of particular events. For example, when an event occurs (e.g., a link is clicked), the segment generation system 106 can collect data corresponding to the event, including a user ID corresponding to the user (or device) that generated the event and the distribution segment traits associated with that user ID. The segment generation system 106 can then store the user ID and corresponding distribution segment traits within the table 300 as a training sample and later use the training sample to train a distribution segment trait recommendation model to generate distribution segment trait recommendations. In some embodiments, the segment generation system 106 collects the training samples (or part of the data corresponding to a training sample) through other means, such as through direct submission of training sample data by users (e.g., via survey or creation of an online profile).

In one more embodiments, the segment generation system 106 stores training samples based on a time frame within which the training samples were collected (or the time frame within which the corresponding event occurred). For example, the segment generation system 106 can store an indication of the time frame corresponding to each training sample within the table 300. In some embodiments, the segment generation system 106 stores training samples corresponding to a first time frame within a first table and training samples corresponding to a second time frame within a second table. Thus, the segment generation system 106 can train a distribution segment recommendation model to generate distribution segment trait recommendations using training samples from a particular time frame. In some embodiments, the segment generation system 106 can combine training samples from any number of time frames and use the combination of training samples to train the distribution segment recommendation model. A time frame can be defined as a day, a week, a month, or any other suitable time frame.

Figure 4:
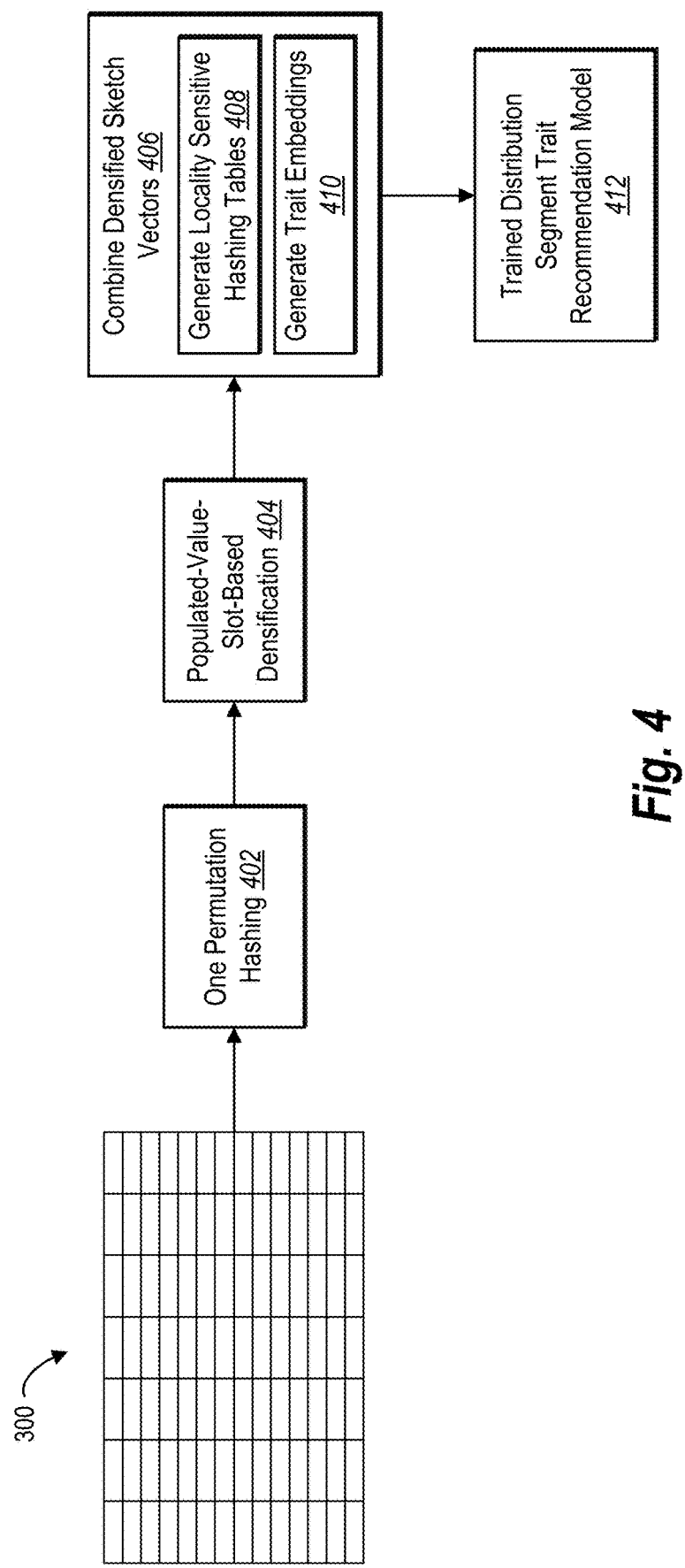
FIG. 4 illustrates a block diagram for training a distribution segment trait recommendation model in accordance with one or more embodiments.

As mentioned, in one or more embodiments, the segment generation system 106 utilizes training samples to train a distribution segment trait recommendation model to generate distribution segment trait recommendations. FIG. 4 illustrates a block diagram for training a distribution segment trait recommendation model in accordance with one or more embodiments.

As shown in FIG. 4, the segment generation system 106 utilizes training samples, such as those stored in the table 300 of FIG. 3, to train a distribution segment trait recommendation model. In one or more embodiments, as shown in FIG. 4, the segment generation system 106 trains the distribution segment trait recommendation model by applying one permutation hashing 402 to the training samples. Specifically, the segment generation system 106 utilizes the one permutation hashing 402 to generate a plurality of sketch vectors where each sketch vector corresponds to a distribution segment trait from the training samples.

In particular, as mentioned, the segment generation system 106 recommends a distribution segment trait based on a similarity between an input distribution segment trait and the distribution segment trait considered for recommendation. In one or more embodiments, the segment generation system 106 determines the similarity between two distribution segment traits utilizing trait embeddings corresponding to the distribution segment traits. In some embodiments, however, the segment generation system 106 determines the similarity using Jaccard similarity, which considers an overlap between the population of user IDs associated with each distribution segment trait. For example, the segment generation system 106 can use U to denote a population set (e.g., the set of user IDs included within the training samples used to train the distribution segment trait recommendation model) where U=[n] for a large integer n and $U^k$ denotes the set of all k dimensional vectors (k being a positive integer) whose coordinates are in U. Given two sets A, B⊆U, where A represents the population of user IDs associated with a first distribution segment trait and B represents the population of user IDs associated with a second distribution segment trait, the segment generation system 106 represents the Jaccard similarity J(A,B) as follows:

$$J(A, B) = \frac{|A \cap B|}{|A \cup B|} \quad (1)$$

In some embodiments, because of the large quantity of data included within the training samples, the segment generation system 106 generates a sketch vector for each distribution segment trait to reduce the dimensionality of the training samples while preserving their key statistics. In one or more embodiments, the segment generation system 106 generates the sketch vectors using the one permutation hashing 402. Given a set A, the segment generation system 106 denotes the corresponding sketch vector as $s(A) = (s(A)_1, \ldots, s(A)_k)$. Accordingly, the segment generation system 106 can utilize the sketch vectors of A and B to obtain an unbiased estimate of the Jaccard similarity J(A,B) using equation 2 below:

$$\tilde{J}(s) = \frac{1}{k} \sum_{i \in [k]} \mathbb{1}(s(A)_i = s(B)_i) \quad (2)$$

In equation 2, i represents a value slot of the corresponding sketch vector and $\mathbb{1}(\cdot)$ represents a function that takes value 1 when the argument is true, and zero otherwise. As shown by equation 2, in one or more embodiments, the segment generation system 106 can use the sketch vectors s(A) and s(B) of sets A and B, respectively, to estimate J(A,B) by doing a pair-wise comparison of the value slots.

In one or more embodiments, the segment generation system 106 utilizes a one permutation hashing model to implement the one permutation hashing 402 and generate sketch vectors. Generating sketch vectors corresponding to distribution segment traits utilizing the one permutation hashing 402 will be discussed in more detail below with reference to FIG. 5.

As shown in FIG. 4, in one or more embodiments, the segment generation system 106 then generates a plurality of densified sketch vectors from the plurality of sketch vectors using populated-value-slot-based densification 404. In particular, the segment generation system 106 generates a densified sketch vector for each sketch vector (i.e., each densified sketch vector corresponds to a distribution segment trait from the training samples).

Specifically, the segment generation system 106 can improve the comparison of distribution segment traits (i.e., more accurately determine the similarity between distribution segment traits) by ensuring that the sketch vectors corresponding to the distribution segment traits have the locality sensitive hashing (LSH) property. For example, the LSH property allows the segment generation system 106 to utilize equation 2 to accurately estimate the Jaccard similarity. In relation to FIG. 4 the segment generation system 106 define the LSH property as:

$$Pr(s(A)_i = s(B))_i = J(A,B) \text{ for } i=1,\ldots,k \quad (3)$$

In some embodiments, however, the sketch vectors resulting from the one permutation hashing 402 have unpopulated value slots. Accordingly, the segment generation system 106 can apply the populated-value-slot-based densification 404 to the sketch vectors to generate densified sketch vectors and maintain the LSH property. In some embodiments, the segment generation system 106 utilizes a populated-value-slot-based densification model to implement the populated-value-slot-based densification 404 and generate densified sketch vectors. Generating densified sketch vectors using the populated-value-slot-based densification 404 will be discussed in more detail below with reference to FIG. 6.

After applying the populated-value-slot-based densification 404, the segment generation system 106 can combine the densified sketch vectors 406. As mentioned, in some embodiments, the segment generation system 106 combines the densified sketch vectors 406 by generating locality sensitive hashing tables 408, which is discussed in more detail below with reference to FIG. 7. In some embodiments, the segment generation system 106 combines the densified sketch vectors 406 by generating trait embeddings 410, which is discussed in more detail below with reference to FIGS. 8A-8B. By combining the densified sketch vectors, the segment generation system 106 generates the trained distribution segment trait recommendation model 412.

Figure 5:
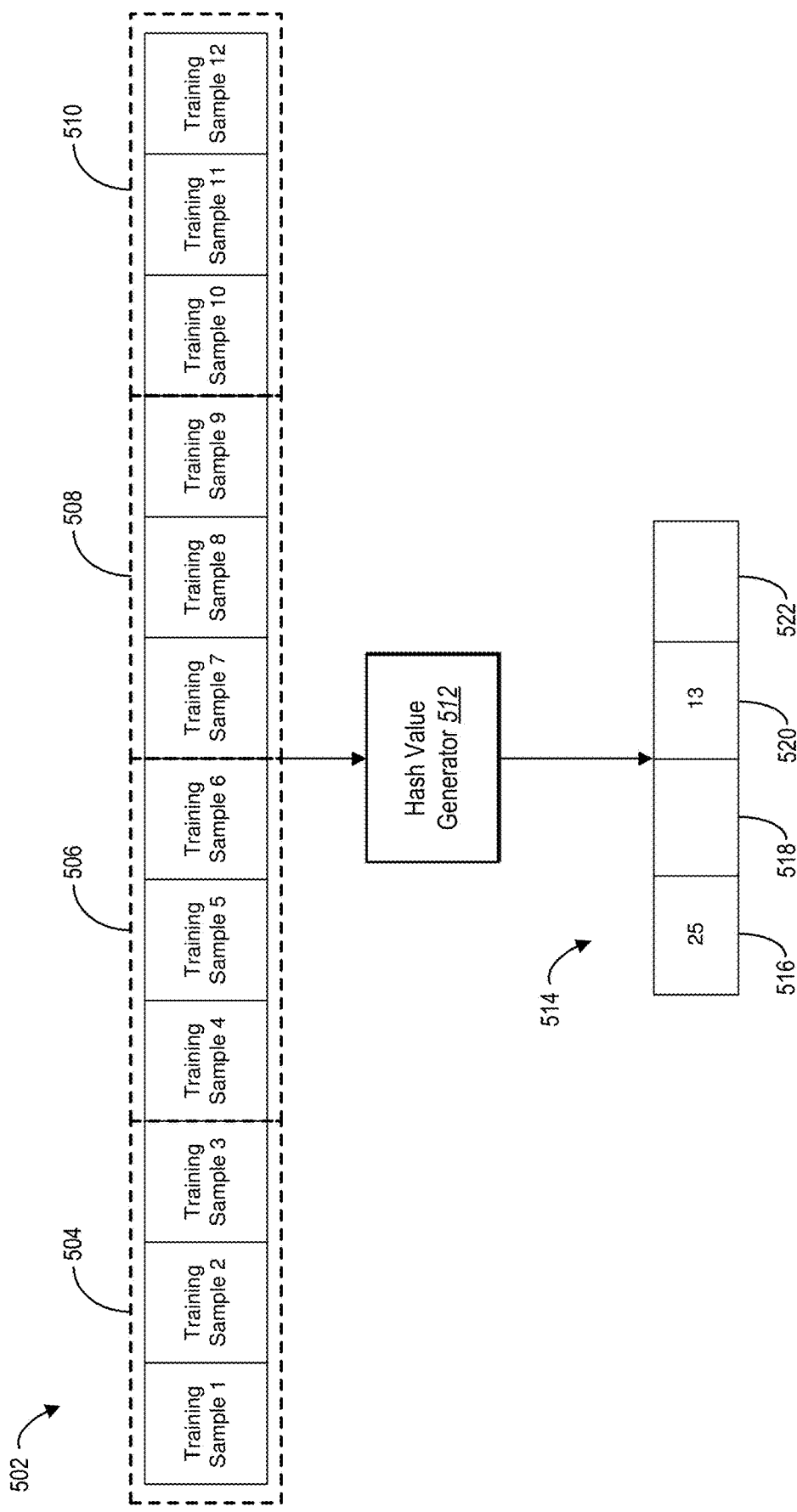
FIG. 5 illustrates a block diagram for applying one permutation hashing to training samples to generate sketch vectors in accordance with one or more embodiments.

As mentioned above, in one or more embodiments, the segment generation system 106 trains a distribution segment trait recommendation model by applying one permutation hashing to training samples (e.g., via a one permutation hashing model) to generate a sketch vector for each distribution segment trait of the training samples. FIG. 5 illustrates a block diagram of the segment generation system 106 applying one permutation hashing to training samples to generate sketch vectors in accordance with one or more embodiments. While FIG. 5 shows the segment generation system 106 applying one permutation hashing to a small set of training samples, it should be noted that the segment generation system 106 can effectively apply the one permutation hashing on a much larger scale (i.e., involving hundreds or thousands of training samples).

In one or more embodiments, to generate a sketch vector corresponding to a distribution segment trait using one hash permutation, the segment generation system 106 divides the population set into various regions. As an illustration, FIG. 5 shows the set of training samples 502 divided into a first region 504, a second region 506, a third region 508, and a fourth region 510, with each region including three training samples. The segment generation system 106 then uses a hash value generator 512 to generate hash values based on the training samples contained within each region and uses the generated hash values to populate one or more value slots of the sketch vector 514 corresponding to the distribution segment trait. In one or more embodiments, the sketch vector 514 has a plurality of value slots, where each value slot corresponds to a region from the set of training samples 502. For example, as shown in FIG. 5, the first value slot 516 corresponds to the first region 504, the second value slot 518 corresponds to the second region 506, the third value slot 520 corresponds to the third region 508, and the fourth value slot 522 corresponds to the fourth region 510.

Specifically, as mentioned above, a particular training sample includes a user ID and a plurality of distribution segment traits associated with the user ID. To generate a sketch vector for a particular distribution segment trait, the hash value generator 512 generates hash values for a region based on whether that region includes training samples corresponding to that distribution segment trait. If the region contains a training sample corresponding to the distribution segment trait, the hash value generator 512 generates a hash value for the region. In one or more embodiments, the hash value generator 512 generates the hash value by applying a hash function to the user ID of the training sample corresponding to the distribution segment trait. The segment generation system 106 can then use the resulting hash value to populate the value slot of the sketch vector 514 corresponding to the region. As an example, the first value slot 516 of the sketch vector 514 contains a value, indicating that at least one of the training samples of the first region 504 corresponded to the particular distribution segment trait.

In one or more embodiments, if a region contains multiple training samples corresponding to the particular distribution segment trait, then the hash value generator 512 generates multiple hash values for that region (e.g., by applying the hash function to the user ID of each training sample corresponding to the distribution segment trait). The hash value generator 512 can then select one of the hash values for the region and the segment generation system 106 can use the selected hash value to populate the value slot of the sketch vector 514 that corresponds to that region. In one or more embodiments, the hash value generator 512 selects the lowest hash value (i.e., the minimum hash value) from among the multiple hash values.

In some embodiments, if a region does not contain any training samples corresponding to the particular distribution segment trait, the hash value generator 512 does not generate any hash values for that region. Consequently, the value slot corresponding to that region remains unpopulated. As an example, FIG. 5 shows the second value slot 518 and the fourth value slot 522 of the sketch vector 514 as unpopulated, indicating that the second region 506 and the fourth region 510 did not contain any training samples corresponding to the distribution segment trait.

For example, to generate a sketch vector of size k, the segment generation system 106 partitions U (i.e., the population set) into equal k sized regions where $U_i$ represents the ith partition (i.e., region) of U. Then the segment generation system 106 determines the ith value slot of the sketch vector of a set A using the following:

$$OPH(A)_i = \begin{cases} \min(\pi(A) \cap U_i) & \text{if } \pi(A) \cap U_i \neq \emptyset \\ e, & \text{otherwise} \end{cases} \quad (4)$$

In equation 4, e is an element representing an empty item and $\pi$ represents a hash function. Let $U_e = U \cup \{e\}$ then $OPH(A) \in U_e^k$ for any $A \subseteq U$. Generally speaking, for $v \in U_e^k$, the segment generation system 106 utilizes $E_v$ to represent the set of empty (i.e., unpopulated) value slots and $N_v$ to represent the set of non-empty (i.e., populated) value slots of v. In other words, $E_v = \{i : v_i = e\}$ and $N_v = \{i : v_i \neq e\}$. When applying the one permutation hashing on A, $B \subseteq U$, an index i is simultaneously empty if the ith value slot of the sketch vectors of both A and B is empty. In other words, $E_{A,B} = E_{OPH(A)} \cap E_{OPH(B)}$ is the set of all simultaneously empty value slots. Similarly, an index is simultaneously non-empty if either $OPH(A)_i$ or $OPH(B)_i$ (or both) is non-empty. In other words, $N_{A,B} = [k] \backslash E_{A,B} = N_{OPH(A)} \cup N_{OPH(B)}$. For all $i \in N_{A,B}$, the following holds:

$$Pr(OPH(A)_i = OPH(B)_i) = J(A,B) \quad (5)$$

However, equation 5 does not necessarily hold true for $i \in E_{A,B}$, indicating the resulting sketch vectors (e.g., the sketch vector 514) do not have the LSH property. Therefore, the segment generation system 106 generates densified sketch vectors having the LSH property from the sketch vectors generated via the one permutation hashing as will be discussed below.

In one or more embodiments, the segment generation system 106 applies the one permutation hashing for each distribution segment trait. In other words, the segment generation system 106 applies a hash function (e.g., the same hash function used to generate the sketch vector 514) to the user IDs of training samples corresponding to the distribution segment trait for which a sketch vector is being generated and uses the resulting hash values to populate the value slot of the sketch vector corresponding to the region containing those training samples.

By using the one hash permutation to generate a sketch vector for each distribution segment trait, the segment generation system 106 efficiently trains the distribution segment trait recommendation model. In particular, the segment generation system 106 applies the hash function to the training samples in one pass (i.e., one step of analyzing the raw training sample data), efficiently generating each sketch vector (i.e., generating the sketch vector more efficiently than conventional systems that use other sketching techniques, such as minwise hashing, which may require hundreds or thousands of passes). Further, as briefly mentioned, the segment generation system 106 can apply the one permutation hashing to training samples based on a time frame (e.g., day, week, etc.) associated with those training samples. Thus, the segment generation system 106 can generate sketch vectors for smaller sets of training samples, allowing for more efficient training of the distribution segment trait recommendation model. This also allows the segment generation system 106 to flexibly combine the sketch vectors from multiple time frames to train the distribution segment trait recommendation model using a larger time frame. In one or more embodiments, the segment generation system 106 generates the densified sketch vectors and then combines the densified sketch vectors to train for a larger time frame. For example, the segment generation system 106 can combine thirty sketch vectors from thirty individual days to generate a single sketch vector for a month (e.g., by selecting the minimum value for each slot from all thirty sketch vectors).

Figure 6:
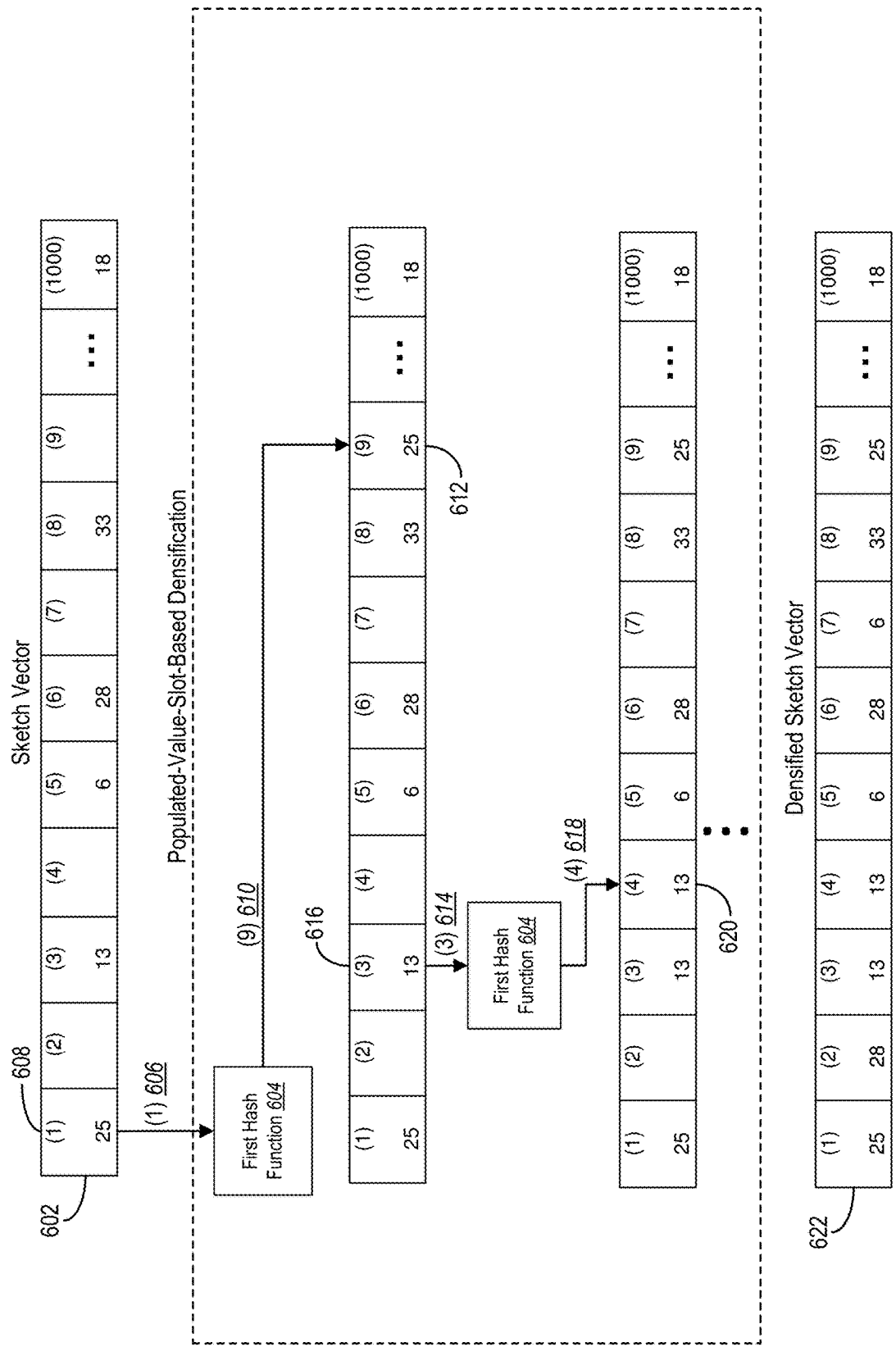
FIG. 6 illustrates a block diagram of the segment generation system applying populated-value-slot-based densification to generate densified sketch vectors in accordance with one or more embodiments.

As mentioned above, in one or more embodiments, the sketch vectors generated by the segment generation system 106 (e.g., the sketch vector 514) have one or more unpopulated value slots as a result of the one permutation hashing process. Therefore, the segment generation system 106 applies densification to the one permutation hashing sketch vectors to populate the unpopulated value slots. In some embodiments, the resulting densified sketch vectors have the LSH property. FIG. 6 illustrates a block diagram of the segment generation system 106 applying populated-value-slot-based densification to generate densified sketch vectors in accordance with one or more embodiments.

As shown in FIG. 6, the sketch vector 602 has a plurality of value slots, including several populated value slots and several unpopulated value slots. The segment generation system 106 applies populated-value-slot-based densification to the sketch vector 602 by iteratively analyzing the populated value slots to identify unpopulated value slots and then populating the identified unpopulated value slots based on the populated value slots. To illustrate, FIG. 6 shows a sketch vector 602 comprising a plurality of populated value slots and a plurality of unpopulated value slates. In FIG. 6, each slot is labeled with an index, such as (1), (2), (3). The segment generation system 106 can fill the unpopulated value slots by iteratively applying hash functions to the index values of the populated value slots.

To illustrate, in relation to FIG. 6 the segment generation system 106 applies a first hash function 604 to an index 606 of a first populated value slot 608 of the sketch vector 602. The first hash function 604 generates a new index value 610. The segment generation system 106 identifies the unpopulated value slot 612 based on the new index value 610 (e.g., the new index value 610 points to the index for the unpopulated value slot 612). The segment generation system 106 then populates the unpopulated value slot 612 based on the first populated value slot 608. For example, as shown in FIG. 6, the segment generation system 106 can populate the unpopulated value slot 612 with a value of the first populated value slot 608 (e.g., a copy of the value of the first populated value slot 608).

As shown in FIG. 6, the segment generation system 106 then applies the first hash function 604 to an index 614 of a second populated value slot 616 to determine a new index value 618. The segment generation system 106 identifies the unpopulated value slot 620 based on the new index value 618 and populates the unpopulated value slot 620 based on the second populated value slot 616. The segment generation system 106 continues to analyze populated value slots and populate unpopulated value slots until every value slot of the sketch vector 602 has been populated. Thus, the segment generation system 106 generates the densified sketch vector 622.

During application of the populated-value-slot-based densification, the new index values generated by a hashing function can point to another populated value slot. If a new index value determined by applying the first hash function 604 corresponds to the index of another populated value slot, the segment generation system 106 can move on to the next populated values slot (e.g., without modifying the value of that populated value slot). Thus, for example, in analyzing the populated value slot 616, the first hash function 604 could generate a new index value that corresponds to a populated value slot (e.g., the value slot 8) rather than an unpopulated value slot. In that circumstance, rather than filling an unpopulated value slot, the segment generation system 106 would move on to the next populated value slot (e.g., apply the first hashing function 605 to the next populated value slot to identify a new index). In this manner, the segment generation system 106 can iteratively analyze populated value slots and fill unpopulated value slots (e.g., when the hash function points to unpopulated value slots) while preserving the LSH property.

In one or more embodiments, if the segment generation system 106 has applied the first hash function 604 to every populated value slot of the sketch vector 602 and one or more unpopulated value slots remain, the segment generation system 106 can continue densification using a second hash function. In particular, the segment generation system 106 can apply the second hash function to the index 606 of the first populated value slot 608 to obtain an index value (different from the index value 610 due to the difference in hash functions), identify a remaining unpopulated value slot based on the index value, populate the unpopulated value slot and continue until all value slots have been populated. The segment generation system 106 can incorporate as many rounds as necessary with as many corresponding hash functions until all value slots have been populated.

The segment generation system 106 applies the populated-value-slot-based densification to each sketch vector having one or more unpopulated value slots. Thus, the segment generation system 106 generates a plurality of densified sketch vectors where each densified sketch vector corresponds to a distribution segment trait from the training samples.

More detail regarding the analysis used in applying the populated-value-slot-based densification will now be provided. Generally speaking, in one or more embodiments, the segment generation system 106 utilizes, for densification, a rule $D:U_e^k \to U^k$ such that $\forall v \in U_e^k$. This leads to the following:

$$\forall i \in N_v : D(v)_i = v_i \quad (6)$$

$$\forall i \in E_v, \exists j \in N_v : D(v)_i = v_j \quad (7)$$

In equation 7, $f_v(i)=j$ where $f_v$ is a function from $E_v$ to $N_v$. As shown by equations 6 and 7, D is a rule that, when applied to a vector $v \in U_e^k$, copies values in populated value slots to unpopulated value slots. Given D and v, $f_v$ is the reassignment function such that $f_v(i)$ is the value slot whose value is copied to i, for every $i \in E_v$.

To implement the populated-value-slot-based densification, the segment generation system 106 lets $h_0, h_1, \ldots : [k] \to (0,k]$ be random hash functions mapping every element $1 \leq i \leq n$ to an independent uniform random value in $(0,k]$. For each $i \in [k]$, the segment generation system 106 lets $$S_i^\alpha = \{j \in [k] : \lceil h_\alpha(j) \rceil = i\} \quad (8)$$

In equation 8, the set $S_i^\alpha$ represents a partition of the range space of $h_\alpha$ into k equal regions. For each $h_\alpha$, the segment generation system 106 defines $g_\alpha:[k] \to [k] \cup e$ as follows:

$$g_\alpha(j) = \begin{cases} i, & \text{if } j = \mathrm{argmin}_{j \in S_i} h_\alpha(j) \\ e, & \text{otherwise} \end{cases} \quad (9)$$

Equation 9 shows that $g_\alpha(j)$ takes value i if an only if $h_\alpha(j)$ attains the smallest value in region i. Algorithm 1 presented below describes the procedure in detail in accordance with one or more embodiments.

| Algorithm 1 Populated-Value-Slot-Based Densification |
| --- |
| Input: v,{$h_\alpha$} |
| Output: D(v) |
|     for j ∈ $N_v$ do |
|         $D(v)_j \leftarrow V_j$ |
|     E ← $E_v$ |
|     a ← 1 |
|     while E ≠ ∅ do |
|         for j ∈ $N_v$ do |
|             if $g_\alpha(j) = i \in E$ then |
|                 $D(v)_i \leftarrow v_j$ |
|                 E ← E\{i} |
|         a ← a + 1 |
|     return D(v) |

As can be seen in Algorithm 1, the segment generation system 106 fills unpopulated value slots in $E_v$ with values from populated value slots in $N_v$ using a family of hash functions. In each round α, the segment generation system 106 utilizes a hash function $h_\alpha$ (or $g_\alpha$). In particular, the segment generation system 106 copies the value of value slot j∈$N_v$ to value slot i∈$E_v$ using {$g_\alpha$} if $g_\alpha(j)=i$ and i is unpopulated at the beginning of the round α. The segment generation system 106 maintains a set E of the currently unpopulated value slots. The segment generation system 106 terminates Algorithm 1 when there are no more unpopulated value slots (i.e., E=∅).

Utilizing populated-value-slot-based densification provides many advantages. For example, using populated-value-slot-based densification generates densified sketch vectors more efficiently than conventional systems leading to more efficient training of the distribution segment trait recommendation model. In particular, populated-value-slot-based densification is takes O(k log k) time in expectation—an improvement over the densification implemented by conventional systems, which require O($k^2$) time or longer. More detail regarding this improved efficiency will now be provided. In particular, the improved expected run time can be shown to be true using the following proof.

Let x be the number of unpopulated value slots that are mapped to by some hash functions in {$h_\alpha$} at any step of Algorithm 1. The probability that an unpopulated value slot is found (i.e., the probability that {$h_\alpha(i)$} maps to an unpopulated value slot among k value slots) is x/k. Therefore, the expected time that an unpopulated value slot is found, given x, is k/x. The total expected number of steps until all value slots are mapped to by some hash function is:

$$\sum_{x=1}^{|E_v|} \frac{k}{x} = kH_{|E_v|} \quad (10)$$

In equation 10, $H_{|E_v|}$ represents the harmonic number of order |$E_v$|. After the segment generation system 106 has found all value slots, there are at most k more steps in the current round. Hence, the total expected densification time is:

$$k + kH_{|E_v|} \quad (11)$$

Because $H_{|E_v|} \leq H_k = O(\log k)$, the running time is O(k log k). Thus, populated-value-slot-based densification generates densified sketch vectors more efficiently.

In addition to improved efficiency, the populated-value-slot-based densification improves the accuracy with which the segment generation system 106 determines the similarity between two distribution segment traits. In particular, the variance caused by densification can be tied, at least partially, to the probability that two simultaneously unpopulated value slots replicate the same populated value slot during densification. As the probability increases, the variance increases. As an example, some of the probabilities for the densification implemented by many conventional systems include $$\frac{2}{m+1}, \frac{1.5}{m+1}, \text{ and } \frac{1}{m}.$$

using populated-value-slot-based densification (e.g., as shown by Algorithm 1), the probability that two simultaneously unpopulated value slots replicate the same simultaneously populated value slot, given |$N_{A,B}$|=m is as follows:

$$\left(1 - \frac{1}{k}\right)^{m-1} \frac{1}{m} < \frac{1}{m} \quad (12)$$

The probability provided by equation 12 can be shown to be true using the following proof. Two simultaneously unpopulated value slots i,j∈$E_{A,B}$ replicate different value slots if they are populated in the same round. The reason is $g_\alpha(i)=g_\alpha(j)=l$ implies ⌈$h_\alpha(l)$⌉ is equal to both i and j, which is a contradiction. Assume that i is populated in round α and j is not populated before α. The probability that j is not populated in the same round is the probability that $h_\alpha(l)$ does not map to value slot j for all l∈$N_{A,B}$\{⌈$h_\alpha(i)$⌉}. This probability equals $$\left(1 - \frac{1}{k}\right)^{m-1}.$$

Conditioning on the event that i and j are populated in different rounds, the segment generation system 106 assumes that i is populated before j from value slot l. The probability that j is populated from l is exactly $$\frac{1}{m}$$

based on the fact that every bin in $N_{A,B}$ has an equal chance of being copied to j. Thus, the probability for the populated-value-slot-based densification is given by equation 12.

In addition to improved efficiency and accuracy, the populated-value-slot-based densification provides densified sketch vectors having the LSH property. In particular, allowing D to represent the populated-value-slot-based densification (e.g., provided by Algorithm 1), then equation 3 becomes, for any A, B⊆U:

$$Pr(D(A)_i = D(B))i = J(A,B) \quad (13)$$

The densified sketch vectors having the LSH property can be shown to be true using the following proof. In particular, if D is a consistent densification, then equation 13 holds true for the populated-value-slot-based densification. For densification to be consistent, for any given simultaneously unpopulated value slot i, the assignment of i should mirror the collision probability of a simultaneously populated value slot j. When that happens, i replicates j.

If v represents a vector in $U_e^k$ and, for each $i \in E_v$, $f_v(i)=j \in N_v$ is the value slot in $N_v$ from which i is assigned value according to D, then $j=g_\alpha^{-1}(i)$ where $\alpha$ is the earliest round such that $i \in g_\alpha(N_v)$. If u represents another vector in $U_e^k$ such that $N_u \subseteq N_v$ and $j \in N_u$, then the earliest round such that $i \in g_\alpha(N_v)$ must also be $\alpha$. Thus, $f_u(i)=j$ as desired for consistency. Therefore, the densified sketch vectors resulting from populated-value-slot-based densification have the desired LSH property, allowing the segment generation system 106 to obtain an unbiased estimation of the Jaccard similarity between two distribution segment traits using equation 2.

Figure 7:
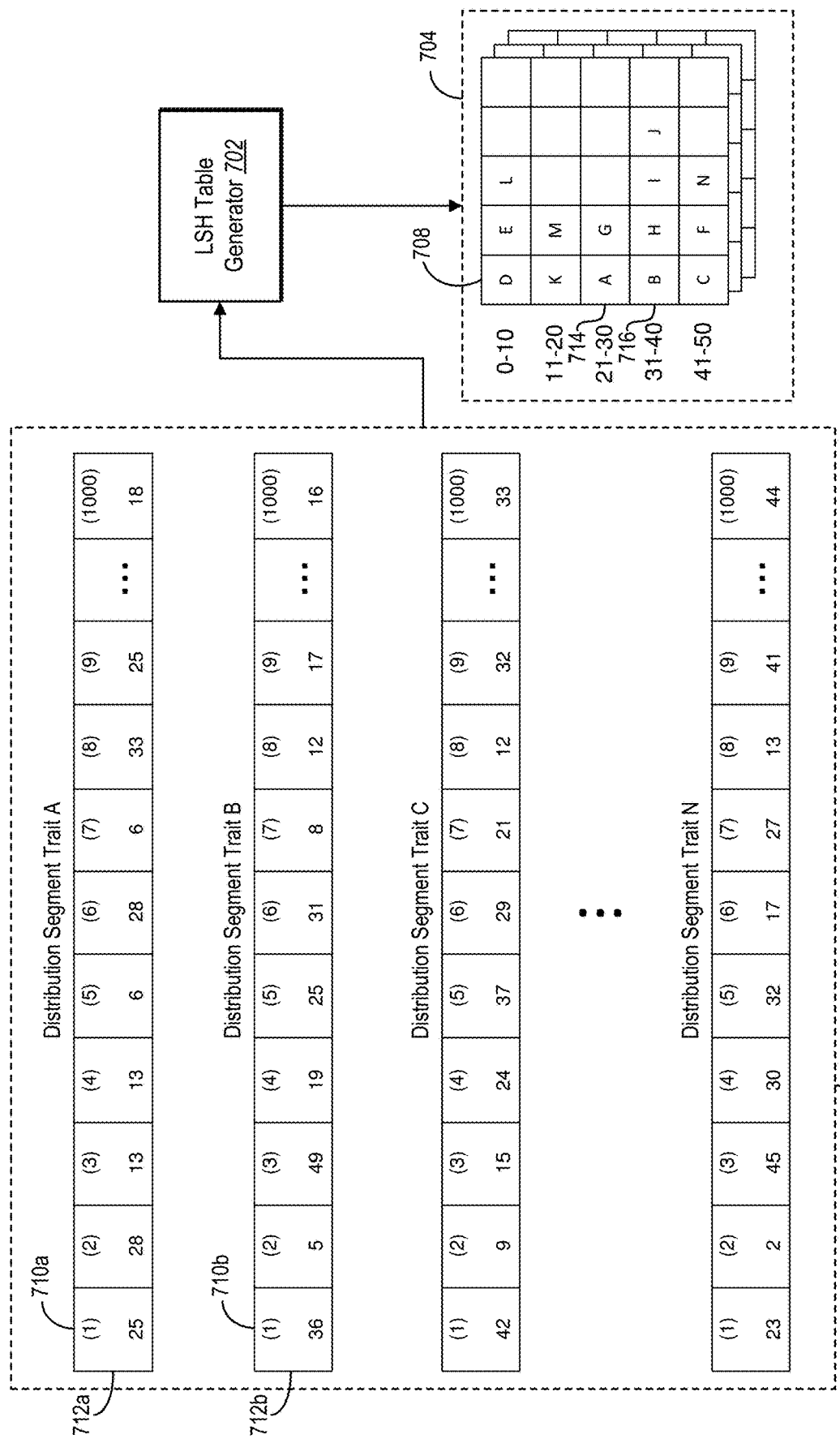
FIG. 7 illustrates a block diagram for generating a plurality of locality sensitive hashing tables in accordance with one or more embodiments.

In one or more embodiments, after generating densified sketch vectors corresponding to each distribution segment trait, the segment generation system 106 combines the densified sketch vectors to generate the distribution segment trait recommendation model. As mentioned, in one or more embodiments, the segment generation system 106 combines the densified sketch vectors by generating a plurality of locality sensitive hashing (LSH) tables from the densified sketch vectors. FIG. 7 illustrates a block diagram for generating a plurality of locality sensitive hashing tables in accordance with one or more embodiments.

As shown in FIG. 7, the segment generation system 106 can utilize an LSH table generator 702 to generate a plurality of LSH tables 704 from a plurality of densified sketch vectors 706. In particular, in one or more embodiments, the segment generation system 106 utilizes the LSH table generator 702 to generate one LSH table corresponding to each value slot index associated with the plurality of densified sketch vectors 706. For example, as shown in FIG. 7, the plurality of LSH tables 704 includes a first LSH table 708 that corresponds to the first value slot of each densified sketch vector from the plurality of densified sketch vectors.

In one or more embodiments, to generate an LSH table, the LSH table generator 702 generates a table and assigns each row in the table a range of values. The LSH table generator 702 then populates one or more rows of the table with a plurality of indicators, each indicator corresponding to a distribution segment trait (i.e., corresponding to the densified sketch vector of the distribution segment trait). In particular, the LSH table generator 702 populates a row with indicators corresponding to distribution segment traits having a value within their respective value slot (i.e., the value slot having an index that corresponds to the LSH table) that falls within the value range assigned to that particular row.

To illustrate, FIG. 7 shows the LSH table generator 702 populating the third row of the first LSH table 708 with an indicator 714 corresponding to the densified sketch vector of distribution segment trait A 712a based on the first value slot 710a containing a value of twenty-five, which falls within the value range assigned to the third row. Similarly, FIG. 7 shows the LSH table generator 702 populating the second row of the first LSH table 708 with an indicator 716 corresponding to the densified sketch vector of distribution segment trait B 712b based on the value of the first value slot 710b falling within the value range assigned to the fourth row. Similarly, the LSH table generator 702 populates the rows of the first LSH table 708 with indicators corresponding to the densified sketch vectors of the other rows. Likewise, the LSH table generator generates and populates additional LSH tables corresponding to the other value slot indices associated with the plurality of densified sketch vectors 706 (e.g., a table for the second value slot and another table for the third value slot). Thus, the segment generation system 106 utilizes the LSH table generator 702 to generate the plurality of LSH tables 704. By generating the plurality of LSH tables 704, the segment generation system 106 can condense the data contained within the plurality of densified sketch vectors 706 into data structures having fewer rows. The segment generation system 106 can then use the plurality of LSH tables 704 to generate distribution segment trait recommendations.

Figure 8A:
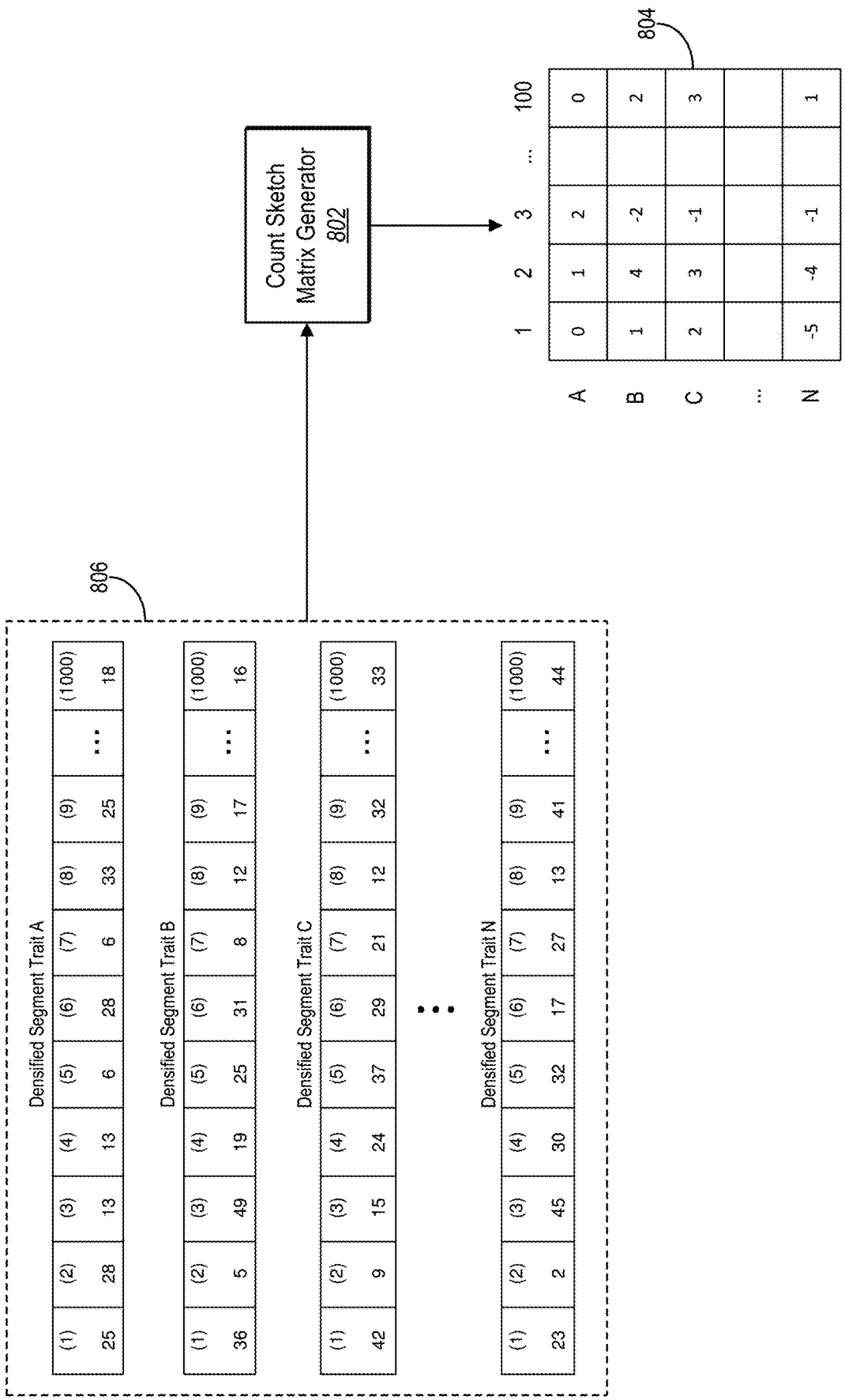
FIGS. 8A-8B illustrate a block diagram for generating trait embedding vectors in accordance with one or more embodiments.
Figure 8B:
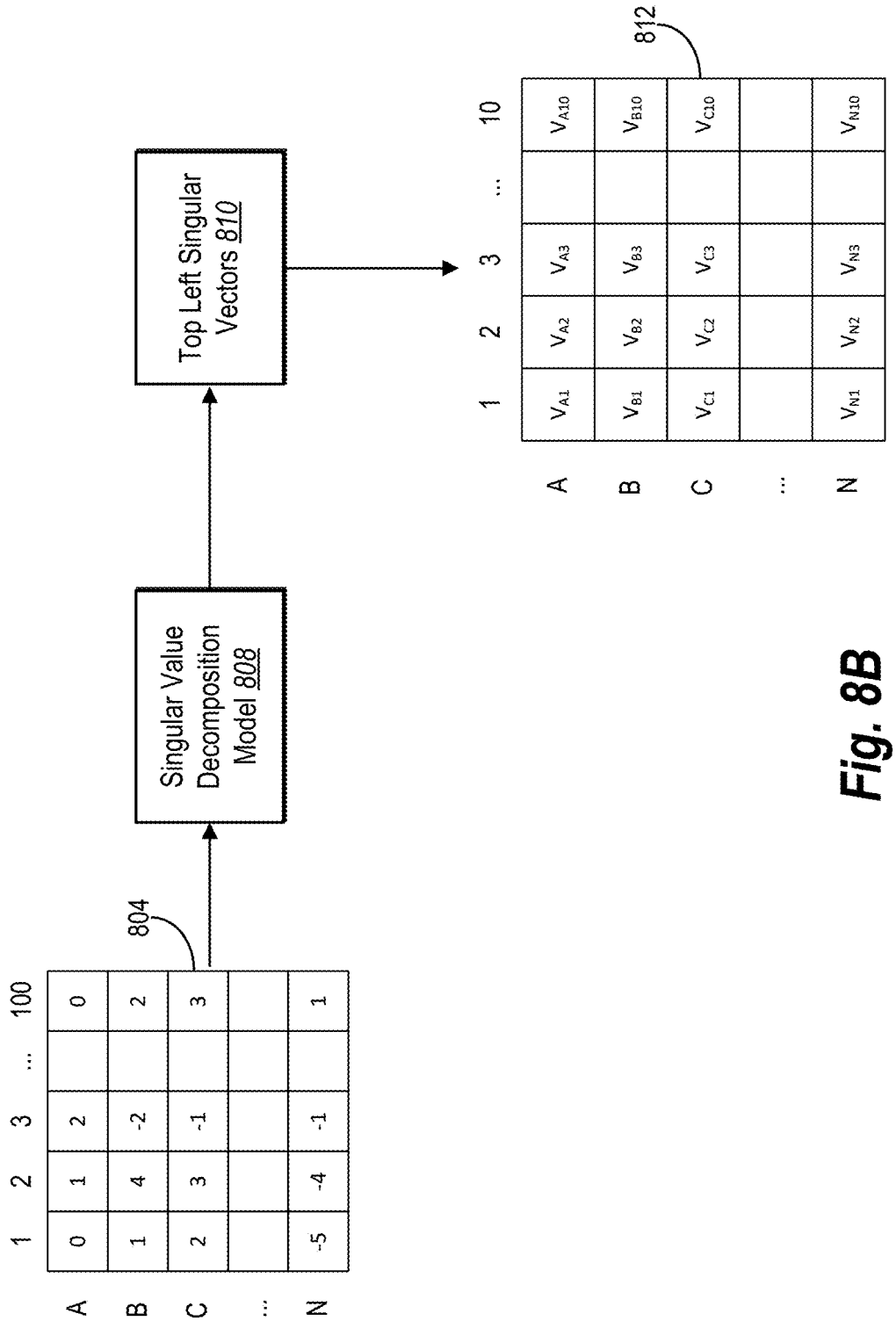

As mentioned above, in one or more embodiments, the segment generation system 106 combines the densified sketch vectors by generating trait embeddings (i.e., trait embedding vectors). FIGS. 8A-8B illustrate a block diagram for generating trait embedding vectors in accordance with one or more embodiments.

As shown in FIG. 8A, the segment generation system 106 utilizes a count sketch matrix generator 802 (e.g., a count sketch algorithm) to generate a count sketch matrix 804 based on the plurality of densified sketch vectors 806. In one or more embodiments, the segment generation system 106 configures the count sketch matrix generator 802 so that the count sketch matrix 804 includes a pre-determined number of columns. In some embodiments, the segment generation system 106 configures the count sketch matrix generator 802 so that the count sketch matrix 804 includes fewer columns than the number of value slots in each densified sketch vector. In other words, the count sketch matrix generator 802 can compress the data included in the plurality of densified sketch vectors 806 into a smaller data structure. For example, as shown in FIG. 8A, the count sketch matrix 804 includes one hundred columns, less than the one thousand value slots included in each densified sketch vector.

In one or more embodiments, each column in the count sketch matrix 802 is associated with a value. For example, each column can be associated with a value corresponding to its column index (e.g., the first column is associated with the value one, etc.). Further, each row in the count sketch matrix 804 can be associated with a particular distribution segment trait.

In one or more embodiments, to generate the count sketch matrix 804, the count sketch matrix generator 802 applies a function, such as a hash function, to a value contained within a value slot of a densified sketch vector. The results of the hash function provide a hash value within some predetermined range of values. In particular, the segment generation system 106 can configure the hash function to generate a hash value within a predetermined value range corresponding to the predetermined number of columns. The count sketch matrix generator 802 then updates an entry of the count sketch matrix 804 for each generated value (e.g., counts the results and shows the count in the table). In particular, the count sketch matrix generator 802 identifies a location within the table that corresponds to the attribute and the value created from the hash function and then modifies that entry. In one or more embodiments, the count sketch matrix generator 802 updates the entry by adding to the current value of the entry (e.g., +1) or subtracting from the current value of the entry (e.g., −1). The count sketch matrix generator 802 performs this process for every value slot of every densified sketch vector to generate the count sketch matrix 804.

The count sketch matrix 804 has the property that the left singular vectors of the count sketch matrix 804 approximate the eigenvectors of a similarity matrix based on the distribution segment traits from the training samples. As used herein, the term "similarity matrix" refers to a data structure that provides the similarity (e.g., the Jaccard similarity) between two variables. In particular, a similarity matrix based on distribution segment traits has rows and columns corresponding to each distribution segment trait. Accordingly, each entry has the Jaccard similarity of the distribution segment trait corresponding to the row and the distribution segment trait corresponding to the column.

As shown in FIG. 8B, the segment generation system 106 utilizes the count sketch matrix 804 to generate a left singular vector matrix 812. In particular, in one or more embodiments, the segment generation system 106 utilizes a singular value decomposition model 808 to determine the left singular vectors of the count sketch matrix 804. The segment generation system 106 then determines the top left singular vectors 810 (i.e., the left singular vectors containing the top singular values) and uses the top left singular vectors 810 to build the left singular vector matrix 812. In one or more embodiments, the top left singular vectors 810 can include any number of left singular vectors.

In one or more embodiments, the segment generation system 106 builds the left singular vector matrix 812 by stacking the top left singular vectors 810. In other words, in one or more embodiments, the segment generation system 106 utilizes the top left singular vectors 810 as the columns for the left singular vector matrix 812. Accordingly, each row of the left singular vector matrix 812 provides a vector for a distribution segment trait.

In one or more embodiments, the segment generation system 106 utilizes the data in each row of the left singular vector matrix 812 as the trait embedding for the distribution segment trait corresponding to that row. In particular, each row provides a trait embedding vector for the corresponding distribution segment trait. In some embodiments, the segment generation system 106 further modifies each row to generate the trait embedding vectors. For example, in some embodiments, the segment generation system 106 can normalize the vectors provided by the left singular vector matrix 812 to generate the trait embedding vectors. In other embodiments, the segment generation system 106 multiplies the left singular vector matrix 812 by a diagonal matrix to generate the trait embedding vectors. Once generated, the segment generation system 106 can utilize the trait embedding vectors in generating distribution segment trait recommendations.

Thus, the segment generation system 106 can train a distribution segment trait recommendation model to generate distribution segment trait recommendations. In particular, the segment generation system 106 can utilize one permutation hashing and populated-value-slot densification to train the distribution segment trait recommendation model. The algorithms and acts described with reference to FIGS. 4-8B can comprise the corresponding structure for performing a step for utilizing one permutation hashing and populated-value-slot-based densification to train a distribution segment trait recommendation model.

Figure 9:
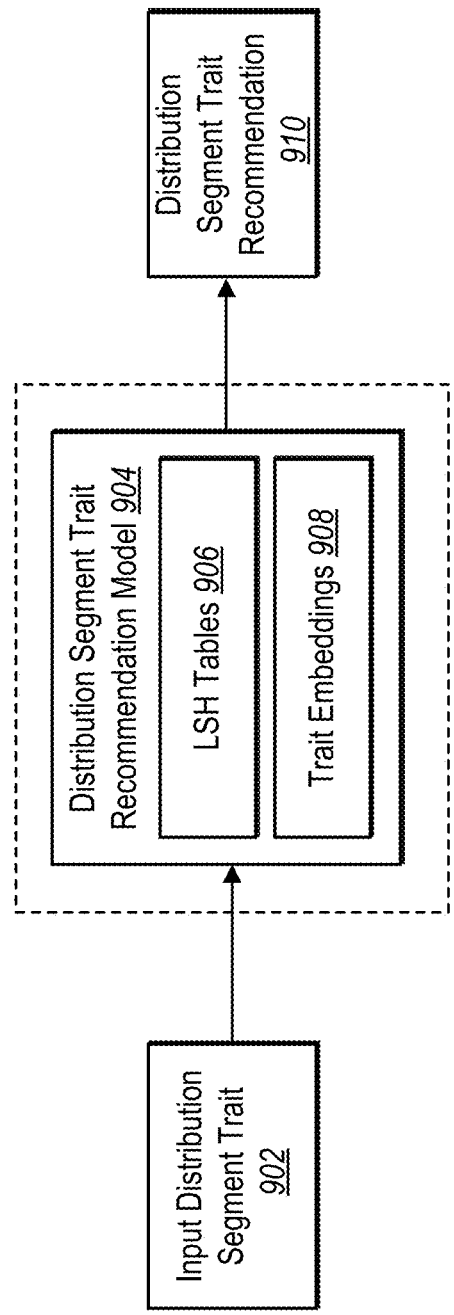
FIG. 9 illustrates a block diagram for utilizing a distribution segment trait recommendation model to generate a distribution segment trait recommendation in accordance with one or more embodiments.

By applying one permutation hashing to training samples to generate a sketch vector for each distribution segment trait included in the training samples, applying populated-value-slot-based densification to the sketch vectors to generate densified sketch vectors, and combining the densified sketch vectors, the segment generation system 106 trains a distribution segment trait recommendation model. The segment generation system 106 can then use the distribution segment trait recommendation model to generate distribution segment trait recommendations. FIG. 9 illustrates a block diagram for utilizing a distribution segment trait recommendation model to generate a distribution segment trait recommendation in accordance with one or more embodiments.

As shown in FIG. 9, the segment generation system 106 utilizes the distribution segment trait recommendation model 904 to generate the distribution segment trait recommendation 910 based on an input distribution segment trait 902. In particular, the input distribution segment trait 902 can comprise a distribution segment trait submitted by a digital content administrator generating or building an audience segment. In one or more embodiments, the distribution segment trait recommendation model 904 utilizes LSH tables 906 to generate the distribution segment trait recommendation 910. In some embodiments, the distribution segment trait recommendation model 904 utilizes trait embeddings 908 to generate the distribution segment trait recommendation 910. Each of these approaches will now be discussed below.

As discussed with reference to FIG. 7, the segment generation system 106 can train the distribution segment trait recommendation model 904 by using the densified sketch vectors corresponding to the distribution segment traits to generate a plurality of LSH tables (i.e., the LSH tables 906). Specifically, the rows of each LSH table are populated with indicators corresponding to the distribution segment traits. In one or more embodiments, to generate the distribution segment trait recommendation 910 using the LSH tables 906, the distribution segment trait recommendation model 904 identifies the row, of each LSH table, that contains an indicator corresponding to the input distribution segment trait 902. The distribution segment trait recommendation model 904 then identifies other distribution segment traits having an indicator in one or more of the same rows as the input distribution segment trait 902. These other identified distribution segment traits are potential recommendation candidates.

The distribution segment trait recommendation model 904 compares the sketch vector of the input distribution segment trait 902 with the sketch vector of every potential recommendation candidate. In one or more embodiments, the distribution segment trait recommendation model 904 compares densified sketch vectors. In some embodiments, the distribution segment trait recommendation model 904 compares the sketch vectors by comparing the value slots of the sketch vectors and determining how many value slots match (i.e., contain the same value). In one or more embodiments, by comparing sketch vectors, the distribution segment trait recommendation model 904 determines the similarity (i.e., an estimate of the similarity) between the input distribution segment trait 902 and the potential recommendation candidates. In particular, the number of matching value slots is equal to the Jaccard similarity of the input distribution segment trait 902 and the potential recommendation candidate under consideration. This is true, because the densified sketch vectors used to generate the LSH tables 906 had the LSH property due to the populated-value-slot-based densification.

The distribution segment trait recommendation model 904 can generate the distribution segment trait recommendation 910 based on the comparison of sketch vectors. For example, in one or more embodiments, the distribution segment trait recommendation model 904 ranks the potential recommendation candidates based on the comparison of sketch vectors. In particular, the distribution segment trait recommendation model 904 ranks a potential candidate higher if that potential candidate is determined to have a relatively higher similarity with the input distribution segment trait 902 (e.g., have a sketch vector with relatively more value slots that match the value slots of the sketch vector of the input distribution segment trait). The distribution segment trait recommendation model 904 can then use the highest ranked potential candidate or several of the highest ranked potential candidates to generate the distribution segment trait recommendation 910.

As discussed with reference to FIGS. 8A-8B, the segment generation system 106 can train the distribution segment trait recommendation model 904 by using the densified sketch vectors to generate trait embeddings corresponding to the distribution segment traits (e.g., the trait embeddings 908). Specifically, in one or more embodiments, the trait embeddings 908 are contained within trait embedding vectors represented as rows in a left singular vector matrix—the rows of the left singular vector matrix may be modified as discussed above (e.g., normalization or multiplication by a diagonal matrix) to obtain the trait embedding vectors. In one or more embodiments, to generate the distribution segment trait recommendation 910 using the trait embeddings 908, the distribution segment trait recommendation model 904 compares the trait embedding vectors to determine which distribution segment traits are similar to the input distribution segment trait 902. For example, in some embodiments, the distribution segment trait recommendation model 904 applies a k-means clustering algorithm to the trait embedding vectors to identify similar distribution segment traits. In other embodiments, the distribution segment trait recommendation model 904 determines the distance, in vector space, between the trait embedding vector of the input distribution segment trait 902 and the trait embedding vectors of the other distribution segment traits. As with using the LSH tables 906, the distribution segment trait recommendation model 904 can use one or more of the distribution segment traits determined to be most similar to the input distribution segment trait 902 to generate the distribution segment trait recommendation 910.

By determining the similarity between distribution segment traits using trait embeddings, the segment generation system 106 operates more flexibly and more accurately than conventional systems. In particular, by analyzing trait embeddings, the segment generation system 106 can flexibly determine that two distribution segment traits are similar, even when the populations of those distribution segment traits do not have any overlap. Because the segment generation system 106 can determine similarity based on factors other than mere overlap of populations, the segment generation system 106 can more accurately determine which distribution segment traits are most similar to an input distribution segment trait.

Thus, the segment generation system 106 can utilize a distribution segment trait recommendation model to generate distribution segment trait recommendations. The algorithms and acts described with reference to FIGS. 7-9 can comprise the corresponding structure for performing a step for utilizing the distribution segment trait recommendation model to generate a distribution segment trait recommendation. In one or more embodiments, the step for utilizing the distribution segment trait recommendation model to generate the distribution segment trait recommendation comprises comparing sketch vectors based on a plurality of locality sensitive hashing tables. In some embodiments, the step for utilizing the distribution segment trait recommendation model to generate the distribution segment trait recommendation comprises comparing trait embedding vectors of a left singular vector matrix generated from densified sketch vectors.

Figure 10:
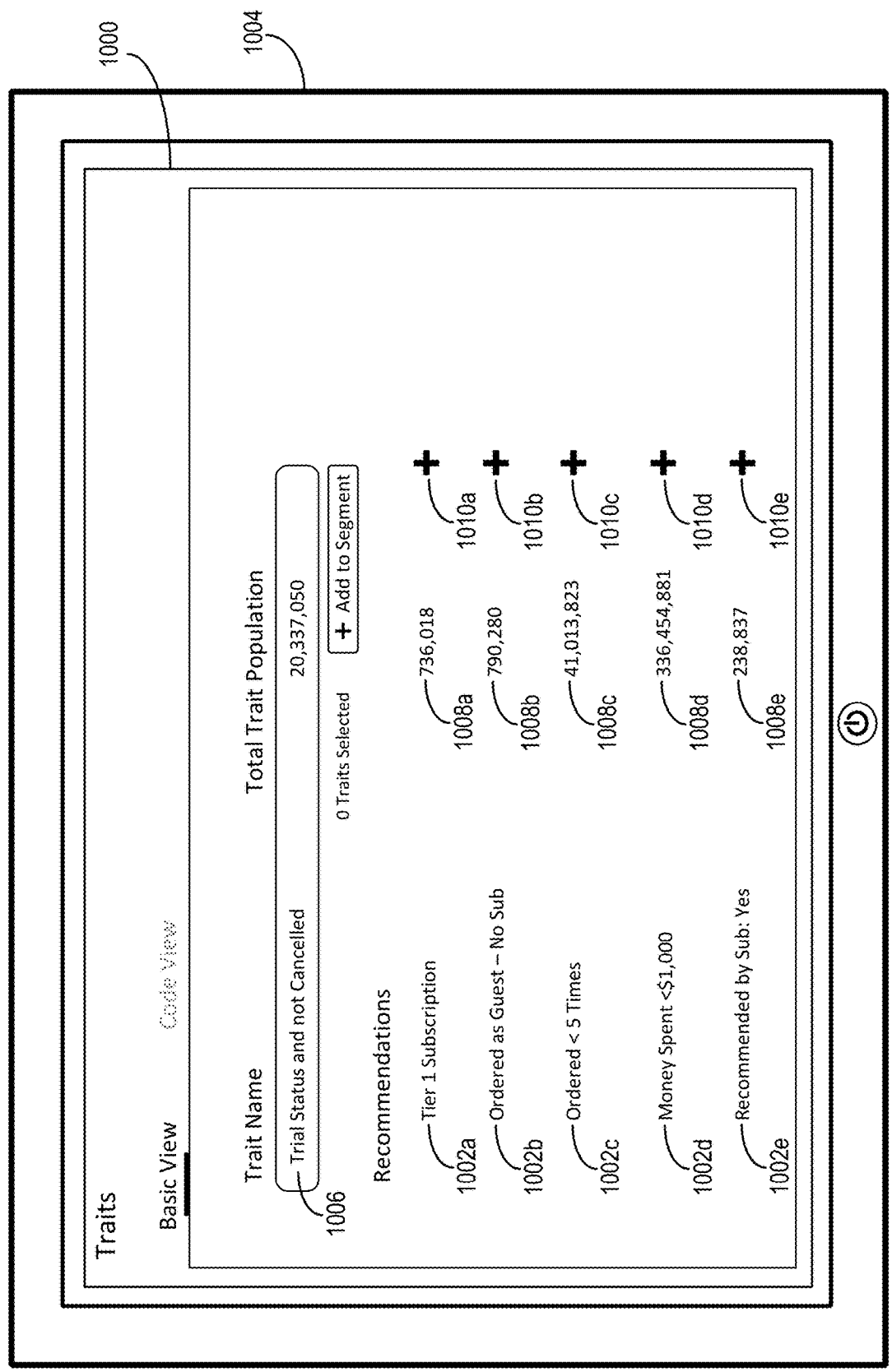
FIG. 10 illustrates a user interface through which the segment generation system can provide distribution segment trait recommendations in accordance with one or more embodiments.

In one or more embodiments, the segment generation system 106 provides distribution segment trait recommendations for display on a client device associated with a digital content administrator (e.g., through a user interface). FIGS. 10-11 illustrates a user interface through which the segment generation system 106 can provide distribution segment trait recommendations in accordance with one or more embodiments.

FIG. 10 illustrates a user interface 1000 displaying distribution segment trait recommendations 1002a-1002e on a client device 1004. In particular, the distribution segment trait recommendations 1002a-1002e correspond to the input distribution segment trait 1006. To illustrate, the segment generation system 106 can identify the input distribution segment trait 1006 submitted by a digital content administrator through the client device 1004 (i.e., through the user interface 1000 or through another user interface). In response, the segment generation system 106 generates the distribution segment trait recommendations 1002a-1002e using a distribution segment trait recommendation model. The segment generation system 106 then provides the input distribution segment trait 1006 and the distribution segment trait recommendations 1002a-1002e for display via the user interface 1000.

In one or more embodiments, the segment generation system 106 can also provide additional information through the user interface 1000. For example, as shown in FIG. 10, the segment generation system 106 can provide, through the user interface 1000, population sizes 1008a-1008e corresponding to the distribution segment trait recommendations 1002a-1002e. In some embodiments, the segment generation system 106 can provide other information, such as a description for each of the distribution segment trait recommendations 1002a-1002e.

Further, the segment generation system 106 can use the user interface 1000 to provide selectable action options 1010a-1010e corresponding to the distribution segment trait recommendations 1002a-1002e. As shown in FIG. 10, the selectable action options 1010a-1010e each comprise an indicator configured to, when selected, add the corresponding recommended distribution segment trait to an audience segment. In one or more embodiments, when a digital content administrator selects to add a recommended distribution segment trait, the segment generation system 106 can further provide, through the user interface 1000 an additional option to delete the added distribution segment trait from the audience segment. Thus, by adding and/or deleting distribution segment traits in response to receiving selections through the user interface 1000, the segment generation system 106 can generate audience segments. Moreover, the segment generation system 106 can distribute digital content to the audience segments (e.g., as part of a digital content campaign).

FIG. 11 illustrates another user interface 1100 displaying distribution segment trait recommendations 1102a-1102e on a client device 1104. In particular, the distribution segment trait recommendations 1102a-1102e correspond to the input distribution segment trait 1106. As shown in FIG. 11, the user interface 1100 displays additional information relative to the user interface 1000 of FIG. 10. In particular, the user interface 1100 displays unique trait realizations 1108, data source 1110, and trait similarity score 1112. Unique trait realizations 1108 provides a count for the number of unique users associated with the distribution segment trait. Data source 1110 provides a data source from which data for the particular distribution segment trait was collected. Trait similarity score 1112 provides a similarity score between the particular distribution segment trait and the input distribution segment trait 1106. For example, in one or more embodiments, the similarity score can represent the Jaccard similarity between the two distribution segment traits (e.g., as determined using the LSH tables). In some embodiments, the segment generation system 106 determines the similarity score based on application of a k-means clustering algorithm to trait embedding vectors corresponding to the distribution segment traits or the distance between the trait embedding vectors in vector space. As shown in FIG. 11, the segment generation system 106 can organize the distribution segment trait recommendations 1102*a*-1102*e* to be displayed from most similar to least similar.

Figure 12:
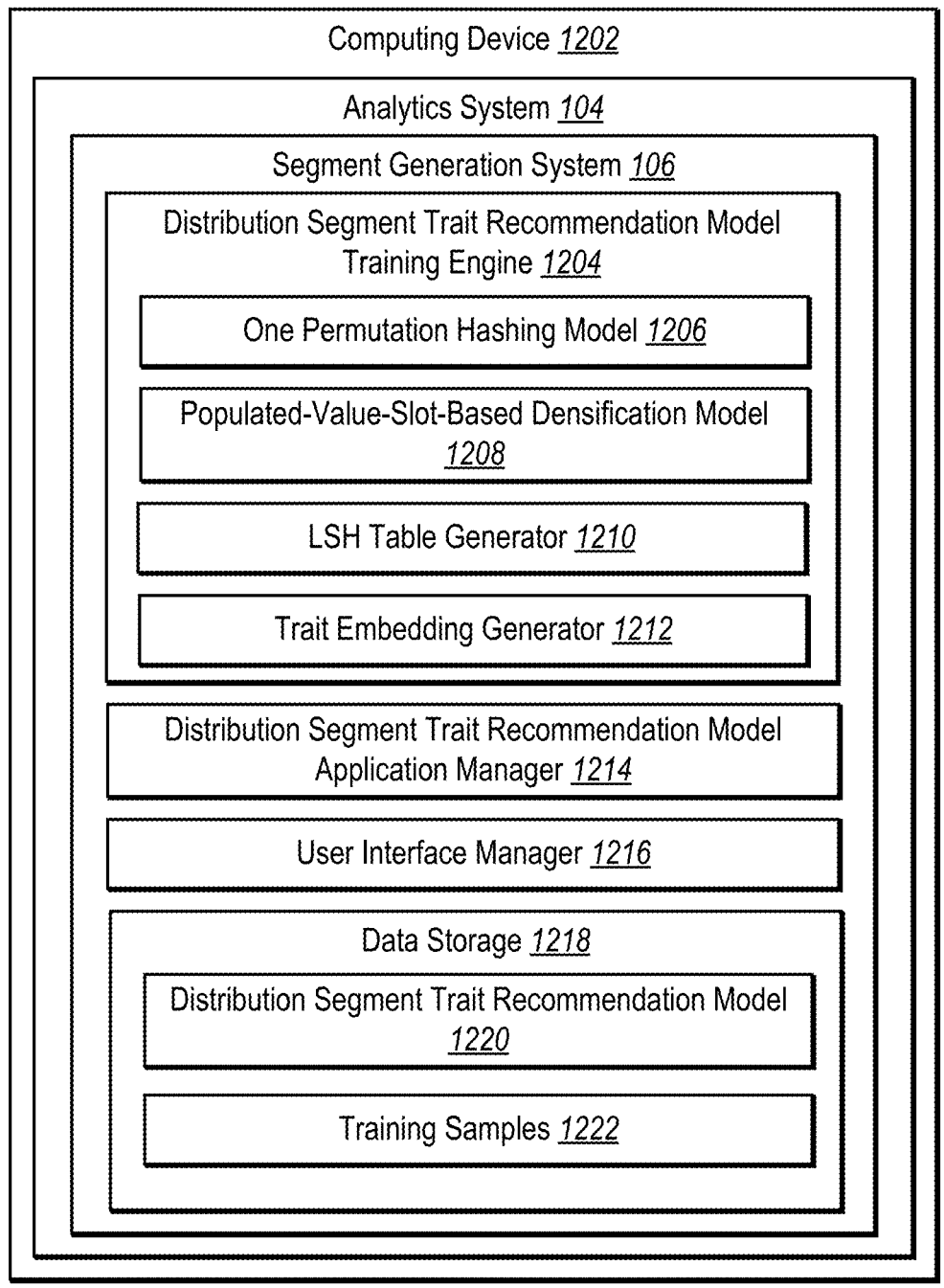
FIG. 12 illustrates an example schematic diagram of a segment generation system in accordance with one or more embodiments.

Turning now to FIG. 12, additional detail will now be provided regarding various components and capabilities of the segment generation system 106. In particular, FIG. 12 illustrates the segment generation system 106 implemented by the computing device 1202 (e.g., the server(s) 102 as discussed above with reference to FIG. 1). Additionally, the segment generation system 106 is also part of the analytics system 104. As shown, the segment generation system 106 can include, but is not limited to, a distribution segment trait recommendation model training engine 1204 (which includes a one permutation hashing model 1206, a populated-value-slot-based densification model 1208, a LSH table generator 1210, and a trait embedding generator 1212), a distribution segment trait recommendation model application manager 1214, a user interface manager 1216 and data storage 1218 (which includes the distribution segment trait recommendation model 1220 and training samples 1222).

As just mentioned, and as illustrated in FIG. 12, the segment generation system 106 includes the distribution segment trait recommendation model training engine 1204. In particular, the distribution segment trait recommendation model training engine 1204 includes the one permutation hashing model 1206, the populated-value-slot-based densification model 1208, the LSH table generator 1210, and the trait embedding generator 1212. The one permutation hashing model 1206 can apply one permutation hashing to training samples comprising a plurality of user IDs and a plurality of corresponding distribution segment traits (e.g., the training samples 1222) in order to generate a sketch vector for each distribution segment trait in the training samples. The populated-value-slot-based densification model 1208 can generate a plurality of densified sketch vectors from the plurality of sketch vectors generated by the one permutation hashing model 1206. In particular, for each sketch vector, the populated-value-slot-based densification model 1208 can iteratively apply a hash function to an index of a populated value slot of the sketch vector to determine an index value, determine an unpopulated value slot of the sketch vector based on the index value, and populate the unpopulated value slot based on the populated value slot.

In one or more embodiments, the segment generation system 106 utilizes the LSH table generator 1210. In particular, the LSH table generator 1210 can generate a plurality of LSH tables from the plurality of densified sketch vectors generated by the populated-value-slot-based densification model 1208. In some embodiments, the segment generation system 106 utilizes the trait embedding generator 1212. In particular, the trait embedding generator 1212 can generate a trait embedding vector for each of the distribution segment traits of the training samples.

Further, as shown, the segment generation system 106 includes the distribution segment trait recommendation model application manager 1214. In particular, the distribution segment trait recommendation model application manager 1214 uses the distribution segment trait recommendation model trained by the distribution segment trait recommendation model training engine 1204. For example, in one or more embodiments, the distribution segment trait recommendation model application manager 1214 uses a plurality of LSH tables generated by the LSH table generator 1210 to determine a similarity between one or more distribution segment traits and an input distribution segment trait. In some embodiments, the distribution segment trait recommendation model application manager 1214 uses trait embedding vectors generated by the trait embedding generator 1212 to determine the similarity between the input distribution segment trait and one or more other distribution segment traits. After the similarities have been determined, the distribution segment trait recommendation model application manager 1214 can generate a distribution segment trait recommendation based on the determined similarities.

Additionally, as shown in FIG. 12, the segment generation system 106 includes the user interface manager 1216. In particular, the user interface manager 1216 provides distribution segment trait recommendations for display on a client device via a user interface. The user interface manager 1216 can further provide information corresponding to each distribution segment trait recommendation, such as the population size corresponding to the distribution segment trait recommendation, the number of unique users contributing to that population size, the data source, and/or a score representing the similarity between the distribution segment trait and the input distribution segment trait. Further, the user interface manager 1216 can detect interactions with the user interface by a digital content administrator, such as a selection by the digital content administrator to add a distribution segment trait to an audience segment.

Further, as shown, the segment generation system 106 includes data storage 1218. In particular, data storage 1218 includes the distribution segment trait recommendation model 1220 and the training samples 1222. The distribution segment trait recommendation model 1220 includes the distribution segment trait recommendation model trained by the distribution segment trait recommendation model training engine 1204 and used by the distribution segment trait recommendation model application manager 1214. Training samples 1222 stores training samples used to train distribution segment trait recommendation models. The distribution segment trait recommendation model training engine 1204 can access a plurality of training samples from the training samples 1222 when training the distribution segment trait recommendation model 1220.

Each of the components 1204-1222 of the segment generation system 106 can include software, hardware, or both. For example, the components 1204-1222 can include one or more instructions stored on a computer-readable storage medium and executable by processors of one or more computing devices, such as a client device or server device. When executed by the one or more processors, the computer-executable instructions of the segment generation system 106 can cause the computing device(s) to perform the methods described herein. Alternatively, the components 1204-1222 can include hardware, such as a special-purpose processing device to perform a certain function or group of functions. Alternatively, the components 1204-1222 of the segment generation system 106 can include a combination of computer-executable instructions and hardware.

Furthermore, the components 1204-1222 of the segment generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1204-1222 of the segment generation system 106 may be implemented as a stand-alone application, such as a desktop or mobile application. Furthermore, the components 1204-1222 of the segment generation system 106 may be implemented as one or more web-based applications hosted on a remote server. Alternatively, or additionally, the components 1204-1222 of the segment generation system 106 may be implemented in a suite of mobile device applications or "apps." For example, in one or more embodiments, the segment generation system 106 can comprise or operate in connection with digital software applications such as ADOBE® ANALYTICS CLOUD® or ADOBE® MARKETING CLOUD®. "ADOBE," "ANALYTICS CLOUD," and "MARKETING CLOUD" are either registered trademarks or trademarks of Adobe Inc. in the United States and/or other countries.

Figure 13:
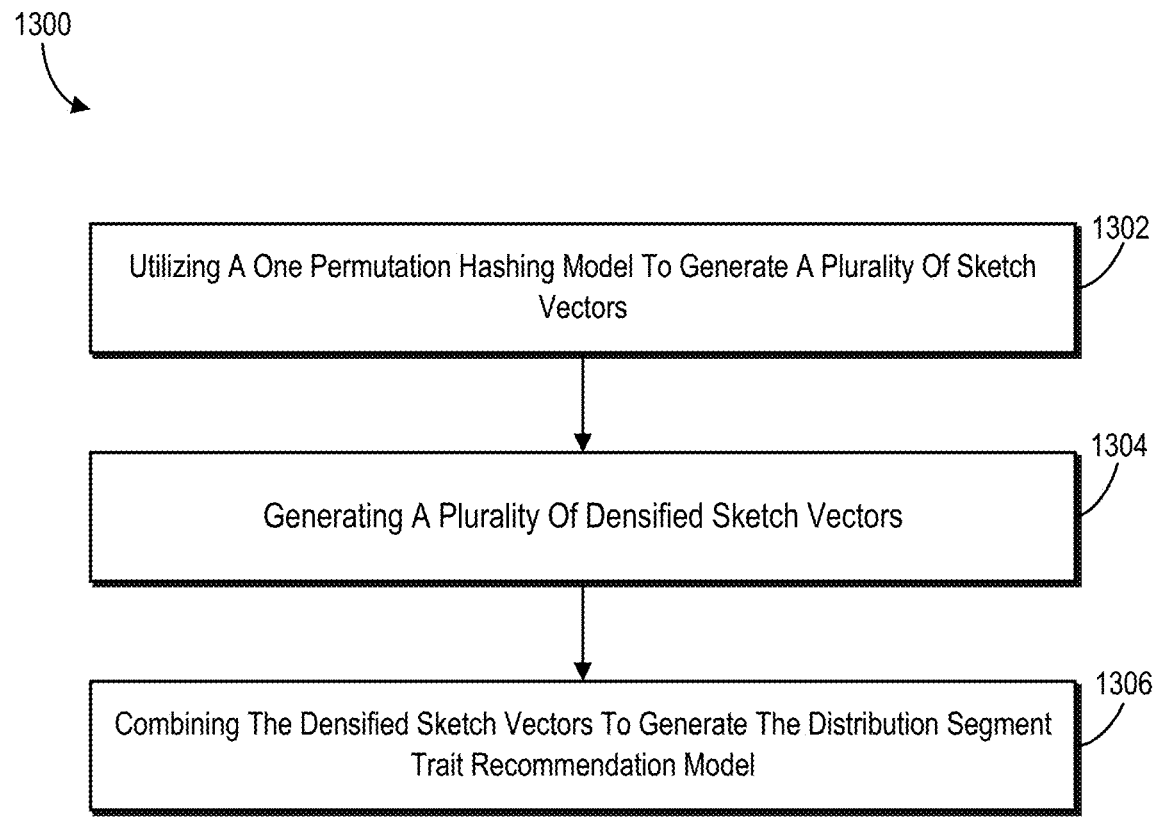
FIG. 13 illustrates a flowchart of a series of acts for training a distribution segment trait recommendation model in accordance with one or more embodiments.

FIGS. 1-12, the corresponding text, and the examples provide a number of different methods, systems, devices, and non-transitory computer readable media of the segment generation system 106. In addition to the foregoing, one or more embodiments can also be described in terms of flowcharts comprising acts for accomplishing a particular result, as shown in FIG. 13. FIG. 13 may be performed with more or fewer acts. Further, the acts may be performed in different orders. Additionally, the acts described herein may be repeated or performed in parallel with one another or in parallel with different instances of the same or similar acts.

As mentioned, FIG. 13 illustrates a flowchart of a series of acts 1300 for training a distribution segment trait recommendation model. While FIG. 13 illustrates acts according to one embodiment, alternative embodiments may omit, add to, reorder, and/or modify any of the acts shown in FIG. 13. The acts of FIG. 13 can be performed as part of a method. For example, in some embodiments, the acts of FIG. 13 can be performed, in a digital medium environment for distributing digital content to client devices over a computer network, as part of a computer-implemented method for generating distribution segment trait recommendations. Alternatively, a non-transitory computer-readable medium (e.g., a non-transitory computer readable storage medium) can comprise instructions that, when executed by at least one processor, cause a computing device to perform the acts of FIG. 13. In some embodiments, a system can perform the acts of FIG. 13. For example, in one or more embodiments, a system includes a memory comprising a repository of training samples, the training samples comprising a plurality of client identifiers and distribution segment traits corresponding to the plurality of client identifiers. The system can further include at least one processor and at least one non-transitory computer readable storage medium storing instructions that, when executed storing instructions that, when executed by the at least one processor, cause the system to perform the acts of FIG. 13.

The series of acts 1300 includes an act 1302 of utilizing a one permutation hashing model to generate a plurality of sketch vectors. For example, the act 1302 involves training a distribution segment trait recommendation model by utilizing a one permutation hashing model to generate a plurality of sketch vectors from training samples, wherein the training samples comprise a plurality of distribution segment traits and each sketch vector corresponds to a distribution segment trait from the training samples.

Providing more focus on a single distribution segment trait, the segment generation system 106 can utilize a one permutation hashing model to generate a sketch vector from the training samples for a first distribution segment trait of the distribution segment traits, wherein the sketch vector comprises one or more populated value slots and one or more unpopulated value slots. In one or more embodiments, utilizing the one permutation hashing model to generate the sketch vector from the training samples for a first distribution segment trait of the distribution segment traits comprises: dividing the training samples into a plurality of sample regions; applying a second hash function to the plurality of sample regions to obtain one or more hash values for each sample region; and generating the sketch vector based on the one or more hash values of each sample region.

The series of acts 1300 also includes an act 1304 of generating a plurality of densified sketch vectors. For example, the act 1304 involves training a distribution segment trait recommendation model by generating a plurality of densified sketch vectors from the plurality of sketch vectors. In one or more embodiments, generating the plurality of densified sketch vectors from the plurality of sketch vectors comprises utilizing a populated-value-slot-based densification model to generate the plurality of densified sketch vectors from the plurality of sketch vectors by iteratively: applying a first hash function to an index of a populated value slot of a sketch vector to determine an index value; determining an unpopulated value slot of the sketch vector based on the index value; and populating the unpopulated value slot of the sketch vector based on the populated value slot of the sketch vector.

Providing more focus on a single sketch vector, the segment generation system 106 can utilize a populated-value-slot-based densification model to generate a densified sketch vector from the sketch vector by iteratively: applying a hash function to an index of a populated value slot of the sketch vector to determine an index value; determining an unpopulated value slot of the sketch vector based on the index value; and populating the unpopulated value slot based on the populated value slot.

In one or more embodiments, generating the plurality of densified sketch vectors from the plurality of sketch vectors further comprises utilizing the populated-value-slot-based densification model to generate the plurality of densified sketch vectors from the plurality of sketch vectors by iteratively: applying a second hash function to the index of the populated value slot of the sketch vector to determine an additional index value; determining an additional unpopulated value slot of the sketch vector based on the additional index value; and populating the additional unpopulated value slot of the sketch vector based on the populated value slot of the sketch vector.

Providing more focus on a single sketch vector, the segment generation system 106 can utilize the populated-value-slot-based densification model to generate the densified sketch vector from the sketch vectors by iteratively: applying a second hash function to the index of the populated value slot of the sketch vector to determine an additional index value; determining an additional unpopulated value slot of the sketch vector based on the additional index value; and populating the additional unpopulated value slot based on the populated value slot.

The series of acts 1300 further includes an act 1306 of combining the densified sketch vectors to generate the distribution segment trait recommendation model. For example, the act 1306 involves training the distribution segment trait recommendation model by combining a densified sketch vector corresponding to a first distribution segment trait with additional densified sketch vectors corresponding to additional distribution segment traits to generate the distribution segment trait recommendation model.

In one or more embodiments, combining the densified sketch vector corresponding to the first distribution segment trait with the additional densified sketch vectors corresponding to the additional distribution segment traits to generate the distribution segment trait recommendation model comprises generating a plurality of locality sensitive hashing tables from the densified sketch vector corresponding to the first distribution segment trait and the additional densified sketch vectors corresponding to the additional distribution segment traits. In some embodiments, combining the densified sketch vector corresponding to the first distribution segment trait with the additional densified sketch vectors corresponding to the additional distribution segment traits to generate the distribution segment trait recommendation model comprises: generating a count sketch matrix based on the densified sketch vector corresponding to the first distribution segment trait and the additional densified sketch vectors corresponding to the additional distribution segment traits; utilizing a singular value decomposition model to determine a plurality of left singular vectors of the count sketch matrix; generating a left singular vector matrix using the plurality left singular vectors; and generating a plurality of trait embedding vectors based on the left singular vector matrix.

In one or more embodiments, the segment generation system 106 trains the distribution segment trait recommendation model by utilizing a singular value decomposition model to generate a plurality of trait embeddings based on the plurality of densified sketch vectors. In particular, the segment generation system 106 can combine the densified sketch vectors by utilizing the singular value decomposition model to generate the plurality of trait embeddings. In particular, in one or more embodiments, the segment generation system can train the distribution segment trait recommendation model by generating a count sketch matrix based on the plurality of densified sketch vectors. Accordingly, utilizing the singular value decomposition model to generate the plurality of trait embeddings based on the plurality of densified sketch vectors comprises: utilizing the singular value decomposition model to determine a plurality of left singular vectors of the count sketch matrix; generating a left singular vector matrix using the left singular vectors; and generating the plurality of trait embedding vectors based on the left singular vectors.

In one or more embodiments, the series of acts 1300 further includes acts for utilizing the distribution segment trait recommendation model to generate distribution segment trait recommendations. For example, in one or more embodiments, the acts can include identifying an input distribution segment trait; utilizing the distribution segment trait recommendation model to generate a distribution segment trait recommendation; and providing the input distribution segment trait and the distribution segment trait recommendation for display. In one or more embodiments, the segment generation system 106 provides, for display, the input distribution segment trait, the distribution segment trait recommendation, and a similarity score corresponding to a similarity between the input distribution segment trait and the distribution segment trait recommendation.

In one or more embodiments (e.g., where the segment generation system 106 has trained the distribution segment trait recommendation model by generating a plurality of locality sensitive hashing tables), the segment generation system 106 utilizes the distribution segment trait recommendation model to generate a distribution segment trait recommendation by comparing the input distribution segment trait and one or more additional distribution segment traits utilizing the plurality of locality sensitive hashing tables.

In one or more embodiments, the segment generation system 106 utilizes the distribution segment trait recommendation model to generate a distribution segment trait recommendation by comparing a first trait embedding corresponding to the input distribution segment trait with a second trait embedding from the plurality of trait embeddings. For example, in one or more embodiments, comparing the trait embedding corresponding to the input distribution segment trait with the second trait embedding from the plurality of trait embeddings comprises determining a vector space distance between a first trait embedding vector corresponding to the input distribution segment trait and a second trait embedding vector corresponding to the second trait embedding. More broadly, the segment generation system 106 can utilize the distribution segment trait recommendation model to generate a distribution segment trait recommendation by: determining a vector space distance between a first trait embedding vector corresponding to the input distribution segment trait and a second trait embedding vector corresponding to an additional distribution segment trait; and generating the distribution segment trait recommendation based on the vector space distance.

The acts can also include utilizing the distribution segment trait recommendation model to generate an additional distribution segment trait recommendation; determining a ranking for the distribution segment trait recommendation and the additional distribution segment trait recommendation; and providing the distribution segment trait recommendation and the additional distribution segment trait recommendation for display based on the ranking.

In one or more embodiments, the series of acts 1300 further includes additional acts for training the distribution segment trait recommendation model using training samples from different time frames. In particular, in one or more embodiments, the training samples (i.e., the training samples from which the one permutation hashing model generates the sketch vector for a first distribution segment trait) are collected within a first time frame. Accordingly, the additional acts can include training the distribution segment trait recommendation model by utilizing the one permutation hashing model to generate a second sketch vector from additional training samples collected within a second time frame; utilizing the populated-value-slot-based densification model to generate a second densified sketch vector from the second sketch vector; and combining the densified sketch vector corresponding to the first distribution segment trait, the additional densified sketch vectors corresponding to the additional distribution segment traits, and the second densified sketch vector to generate the distribution segment trait recommendation model.

More broadly, the training samples (e.g., the training samples from which the one permutation hashing model generates a plurality of sketch vectors) are collected from a first time frame. Accordingly, the additional acts can include training the distribution segment trait recommendation model by utilizing the one permutation hashing model to generate a second plurality of sketch vectors from additional training samples collected within a second time frame; and generating the plurality of densified sketch vectors from the plurality of sketch vectors and the second plurality of sketch vectors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
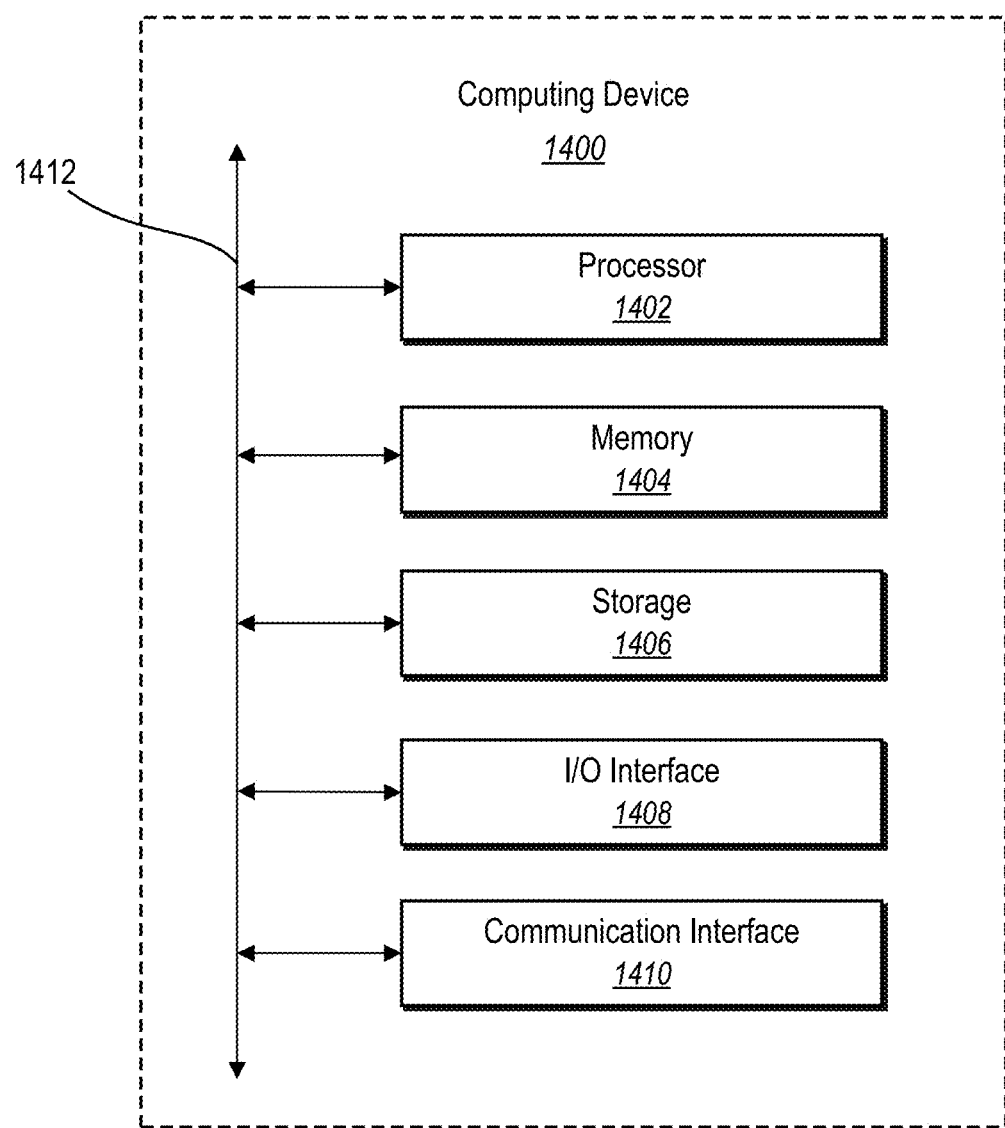
FIG. 14 illustrates a block diagram of an exemplary computing device in accordance with one or more embodiments.

FIG. 14 illustrates a block diagram of an example computing device 1400 that may be configured to perform one or more of the processes described above. One will appreciate that one or more computing devices, such as the computing device 1400 may represent the computing devices described above (e.g., the server(s) 102, client devices 116a-116n, and the digital content administrator device 108). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    train a distribution segment trait recommendation model by:
        utilizing a one permutation hashing model to generate a plurality of sketch vectors from training samples, wherein the training samples comprise a plurality of distribution segment traits and each sketch vector corresponds to a distribution segment trait from the training samples;
        generating a plurality of densified sketch vectors from the plurality of sketch vectors by populating unpopulated value slots of the plurality of sketch vectors based on analyzing populated value slots of the plurality of sketch vectors; and
        utilizing a singular value decomposition model to generate a plurality of trait embeddings based on the plurality of densified sketch vectors; and
    identify an input distribution segment trait; and
    utilize the distribution segment trait recommendation model to generate a distribution segment trait recommendation by comparing a first trait embedding corresponding to the input distribution segment trait with a second trait embedding from the plurality of trait embeddings.

2. The non-transitory computer readable storage medium of claim 1, further comprising instructions that, when executed by the at least one processor, cause the computing device to train the distribution segment trait recommendation model by generating a count sketch matrix based on the plurality of densified sketch vectors.

3. The non-transitory computer readable storage medium of claim 2, wherein utilizing the singular value decomposition model to generate the plurality of trait embeddings based on the plurality of densified sketch vectors comprises:
    utilizing the singular value decomposition model to determine a plurality of left singular vectors of the count sketch matrix;

generating a left singular vector matrix using the left singular vectors; and
generating a plurality of trait embedding vectors based on the left singular vectors.

4. The non-transitory computer readable storage medium of claim 3, wherein comparing the first trait embedding corresponding to the input distribution segment trait with the second trait embedding from the plurality of trait embeddings comprises determining a vector space distance between a first trait embedding vector corresponding to the input distribution segment trait and a second trait embedding vector corresponding to the second trait embedding.

5. The non-transitory computer readable storage medium of claim 1,
wherein the training samples are collected within a first time frame, and
further comprising instructions that, when executed by the at least one processor, cause the computing device to train the distribution segment trait recommendation model by:
utilizing the one permutation hashing model to generate a second plurality of sketch vectors from additional training samples collected within a second time frame; and
generating the plurality of densified sketch vectors from the plurality of sketch vectors and the second plurality of sketch vectors.

6. The non-transitory computer readable storage medium of claim 1, wherein generating the plurality of densified sketch vectors from the plurality of sketch vectors by populating the unpopulated value slots of the plurality of sketch vectors based on analyzing the populated value slots of the plurality of sketch vectors comprises utilizing a populated-value-slot-based densification model to generate the plurality of densified sketch vectors from the plurality of sketch vectors by iteratively:
applying a first hash function to an index of a populated value slot of a sketch vector to determine an index value;
determining an unpopulated value slot of the sketch vector based on the index value; and
populating the unpopulated value slot of the sketch vector based on the populated value slot of the sketch vector.

7. The non-transitory computer readable storage medium of claim 6, wherein generating the plurality of densified sketch vectors from the plurality of sketch vectors by populating the unpopulated value slots of the plurality of sketch vectors based on analyzing the populated value slots of the plurality of sketch vectors further comprises utilizing the populated-value-slot-based densification model to generate the plurality of densified sketch vectors from the plurality of sketch vectors by iteratively:
applying a second hash function to the index of the populated value slot of the sketch vector to determine an additional index value;
determining an additional unpopulated value slot of the sketch vector based on the additional index value; and
populating the additional unpopulated value slot of the sketch vector based on the populated value slot of the sketch vector.

8. The non-transitory computer readable storage medium of claim 1, further comprising instructions that, when executed by the at least one processor, cause the computing device to provide, for display, the input distribution segment trait, the distribution segment trait recommendation, and a similarity score corresponding to a similarity between the input distribution segment trait and the distribution segment trait recommendation.

9. In a digital medium environment for distributing digital content to client devices over a computer network, a computer-implemented method for generating distribution segment trait recommendations, comprising:
training a distribution segment trait recommendation model by:
utilizing a one permutation hashing model to generate a plurality of sketch vectors from training samples, wherein the training samples comprise a plurality of distribution segment traits and each sketch vector corresponds to a distribution segment trait from the training samples;
generating a plurality of densified sketch vectors from the plurality of sketch vectors by populating unpopulated value slots of the plurality of sketch vectors based on analyzing populated value slots of the plurality of sketch vectors; and
utilizing a singular value decomposition model to generate a plurality of trait embeddings based on the plurality of densified sketch vectors; and
identifying an input distribution segment trait; and
utilizing the distribution segment trait recommendation model to generate a distribution segment trait recommendation by comparing a first trait embedding corresponding to the input distribution segment trait with a second trait embedding from the plurality of trait embeddings.

10. The method of claim 9 further comprising training the distribution segment trait recommendation model by generating a count sketch matrix based on the plurality of densified sketch vectors.

11. The method of claim 10, wherein utilizing the singular value decomposition model to generate the plurality of trait embeddings based on the plurality of densified sketch vectors comprises:
utilizing the singular value decomposition model to determine a plurality of left singular vectors of the count sketch matrix;
generating a left singular vector matrix using the left singular vectors; and
generating a plurality of trait embedding vectors based on the left singular vectors.

12. The method of claim 11, wherein comparing the first trait embedding corresponding to the input distribution segment trait with the second trait embedding from the plurality of trait embeddings comprises determining a vector space distance between a first trait embedding vector corresponding to the input distribution segment trait and a second trait embedding vector corresponding to the second trait embedding.

13. The method of claim 9,
wherein the training samples are collected within a first time frame, and
further comprising training the distribution segment trait recommendation model by:
utilizing the one permutation hashing model to generate a second plurality of sketch vectors from additional training samples collected within a second time frame; and
generating the plurality of densified sketch vectors from the plurality of sketch vectors and the second plurality of sketch vectors.

14. The method of claim 9, wherein generating the plurality of densified sketch vectors from the plurality of sketch vectors by populating the unpopulated value slots of the plurality of sketch vectors based on analyzing the populated value slots of the plurality of sketch vectors comprises utilizing a populated-value-slot-based densification model to generate the plurality of densified sketch vectors from the plurality of sketch vectors by iteratively:

applying a first hash function to an index of a populated value slot of a sketch vector to determine an index value;

determining an unpopulated value slot of the sketch vector based on the index value; and populating the unpopulated value slot of the sketch vector based on the populated value slot of the sketch vector.

15. The method of claim 14, wherein generating the plurality of densified sketch vectors from the plurality of sketch vectors by populating the unpopulated value slots of the plurality of sketch vectors based on analyzing the populated value slots of the plurality of sketch vectors further comprises utilizing the populated-value-slot-based densification model to generate the plurality of densified sketch vectors from the plurality of sketch vectors by iteratively:

applying a second hash function to the index of the populated value slot of the sketch vector to determine an additional index value;

determining an additional unpopulated value slot of the sketch vector based on the additional index value; and populating the additional unpopulated value slot of the sketch vector based on the populated value slot of the sketch vector.

16. The method of claim 9, further comprising providing, for display, the input distribution segment trait, the distribution segment trait recommendation, and a similarity score corresponding to a similarity between the input distribution segment trait and the distribution segment trait recommendation.

17. A system comprising:
at least one processor; and
at least one non-transitory computer-readable medium storing instructions that, when executed by the at least one processor, cause the system to:
train a distribution segment trait recommendation model by:
utilizing a one permutation hashing model to generate a plurality of sketch vectors from training samples, wherein the training samples comprise a plurality of distribution segment traits and each sketch vector corresponds to a distribution segment trait from the training samples;

generating a plurality of densified sketch vectors from the plurality of sketch vectors by populating unpopulated value slots of the plurality of sketch vectors based on analyzing populated value slots of the plurality of sketch vectors; and utilizing a singular value decomposition model to generate a plurality of trait embeddings based on the plurality of densified sketch vectors; and identify an input distribution segment trait; and utilize the distribution segment trait recommendation model to generate a distribution segment trait recommendation by comparing a first trait embedding corresponding to the input distribution segment trait with a second trait embedding from the plurality of trait embeddings.

18. The system of claim 17, further comprising instructions that, when executed by the at least one processor, cause the system to train the distribution segment trait recommendation model by generating a count sketch matrix based on the plurality of densified sketch vectors.

19. The system of claim 18, wherein utilizing the singular value decomposition model to generate the plurality of trait embeddings based on the plurality of densified sketch vectors comprises:

utilizing the singular value decomposition model to determine a plurality of left singular vectors of the count sketch matrix;

generating a left singular vector matrix using the left singular vectors; and generating a plurality of trait embedding vectors based on the left singular vectors.

20. The system of claim 19, wherein comparing the first trait embedding corresponding to the input distribution segment trait with the second trait embedding from the plurality of trait embeddings comprises determining a vector space distance between a first trait embedding vector corresponding to the input distribution segment trait and a second trait embedding vector corresponding to the second trait embedding.

* * * * *